United States Patent
Kyuto et al.

(10) Patent No.: US 12,215,903 B2
(45) Date of Patent: Feb. 4, 2025

(54) REFRIGERATION CYCLE DEVICE

(71) Applicant: DENSO CORPORATION, Kariya (JP)

(72) Inventors: Tatsurou Kyuto, Kariya (JP); Yasuhiro Yokoo, Kariya (JP); Yoshinori Yanagimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 211 days.

(21) Appl. No.: 17/947,935

(22) Filed: Sep. 19, 2022

(65) Prior Publication Data

US 2023/0019047 A1 Jan. 19, 2023

Related U.S. Application Data

(63) Continuation of application No. PCT/JP2021/006819, filed on Feb. 24, 2021.

(30) Foreign Application Priority Data

Mar. 23, 2020 (JP) .................................. 2020-051519

(51) Int. Cl.
*F25B 41/20* (2021.01)
*F25B 5/02* (2006.01)
*F25B 43/02* (2006.01)

(52) U.S. Cl.
CPC ................ *F25B 43/02* (2013.01); *F25B 5/02* (2013.01); *F25B 41/20* (2021.01)

(58) Field of Classification Search
CPC ............. F25B 43/02; F25B 41/20; F25B 5/02
(Continued)

(56) References Cited

U.S. PATENT DOCUMENTS 6,266,967 B1  7/2001  Honda
2012/0255319 A1  10/2012  Itoh et al.
(Continued)

FOREIGN PATENT DOCUMENTS

JP  2000283576 A  10/2000
JP  2012225637 A  11/2012
(Continued)

OTHER PUBLICATIONS

Horikoshi, Vehicle air conditioner, 2017, Full Document (Year: 2017).*

*Primary Examiner* — Nael N Babaa
(74) *Attorney, Agent, or Firm* — Harness, Dickey & Pierce, P.L.C.

(57) ABSTRACT

A refrigeration cycle device includes: a switching valve configured to switch between a battery mode in which refrigerant flows to a battery heat exchanger and a non-battery mode in which the refrigerant bypasses the battery heat exchanger; and a controller controlling a compressor and the switching valve. The controller includes an estimation unit configured to estimate an oil stagnation amount, which is an amount of lubricating oil accumulated in the battery heat exchanger in accordance with execution of the non-battery mode. The controller includes a determination unit configured to determine whether lubricating oil in the battery heat exchanger needs to be recovered on the basis of the oil stagnation amount. The controller includes an execution unit configured to execute an oil recovery mode for recovery of lubricating oil in the battery heat exchanger when the determination unit determines that lubricating oil needs to be recovered.

7 Claims, 18 Drawing Sheets

(58) Field of Classification Search
USPC .......................................................... 62/192
See application file for complete search history.

(56) References Cited

U.S. PATENT DOCUMENTS

| | | |
|---|---|---|
| 2015/0159933 A1 | 6/2015 | Itoh et al. |
| 2020/0343611 A1 | 10/2020 | Shimizu |
| 2021/0031588 A1* | 2/2021 | Yahia ...................... F25B 49/02 |

FOREIGN PATENT DOCUMENTS

| JP | 2016194389 A | | 11/2016 | |
|---|---|---|---|---|
| JP | 2019051890 A | * | 4/2019 | ............... B60H 1/22 |
| JP | 2019129087 A | | 8/2019 | |

* cited by examiner

REFRIGERATION CYCLE DEVICE

CROSS REFERENCE TO RELATED APPLICATION

The present application is a continuation application of International Patent Application No. PCT/JP2021/006819 filed on Feb. 24, 2021, which designated the U.S. and claims the benefit of priority from Japanese Patent Application No. 2020-051519 filed on Mar. 23, 2020. The entire disclosures of all of the above applications are incorporated herein by reference.

TECHNICAL FIELD

The present description relates to a refrigeration cycle device.

BACKGROUND

In a refrigeration cycle device, an oil returning control is performed to increase a flow rate of a refrigerant flowing to a cooler of a battery cooling system to forcibly send oil retained in the battery cooling system. The oil returning control is performed when an execution condition is satisfied.

SUMMARY

In a refrigeration cycle device, a controller is provided with: an estimation unit configured to estimate an oil stagnation amount, which is an amount of lubricating oil accumulated in a battery heat exchanger in accordance with execution of a non-battery mode; a determination unit configured to determine whether or not lubricating oil in the battery heat exchanger needs to be recovered on the basis of an oil stagnation amount; and an execution unit configured to execute an oil recovery mode for recovery of the lubricating oil in the battery heat exchanger when the determination unit determines that lubricating oil needs to be recovered. Accordingly, it is possible to provide the refrigeration cycle device that suppresses oil stagnation in the battery heat exchanger.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
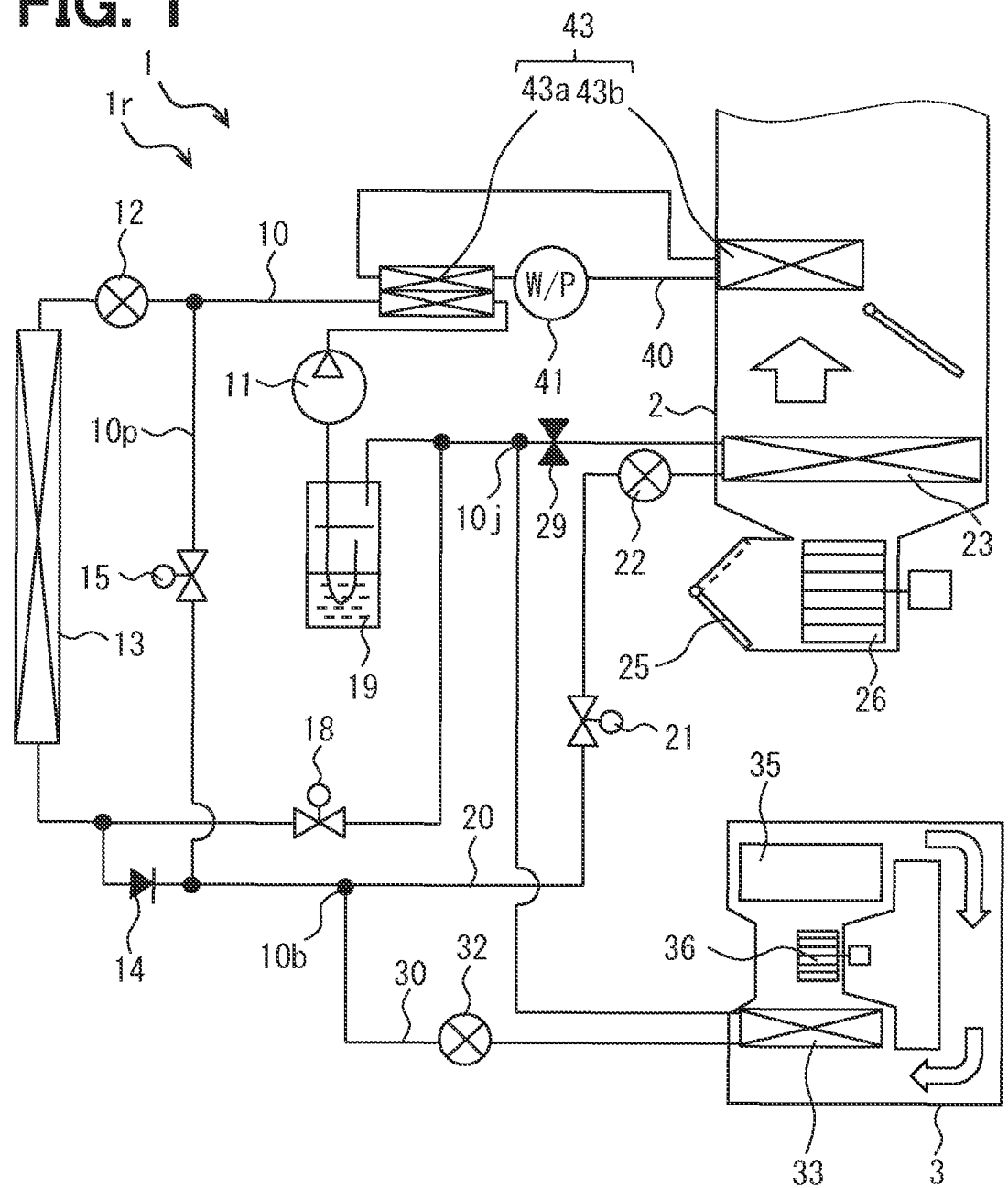
FIG. 1 is a configuration diagram illustrating a configuration of a vehicle air-conditioning device.

In a refrigeration cycle device, an oil returning operation may be performed in a state where a flow rate of refrigerant is reduced, such as in a low battery load in which charging and discharging of a battery is small. However, even in a situation where the refrigerant does not flow into a battery cooling system, oil may stay in a cooler.

An object of the present disclosure is to provide a refrigeration cycle device that suppresses oil stagnation in a battery heat exchanger.

A refrigeration cycle device according to an exemplar of the present disclosure may include: a compressor configured to compress a refrigerant containing lubricating oil; a radiator configured to radiate heat from the refrigerant compressed by the compressor; an exterior heat exchanger configured to exchange heat between outside air and the refrigerant; an interior heat exchanger configured to exchange heat between inside air and the refrigerant; a battery heat exchanger configured to exchange heat between a battery device and the refrigerant; a refrigerant pipe connecting the compressor, the radiator, the exterior heat exchanger, the interior heat exchanger, and the battery heat exchanger to form a refrigerant flow path; a switching valve configured to switch between a battery mode in which the refrigerant flows to the battery heat exchanger and a non-battery mode in which the refrigerant bypasses the battery heat exchanger; and a controller configured to control the compressor and the switching valve. The controller may include an estimation unit configured to estimate an oil stagnation amount that is an amount of lubricating oil accumulated in the battery heat exchanger in accordance with execution of the non-battery mode, a determination unit configured to determine whether lubricating oil in the battery heat exchanger needs to be recovered based on the oil stagnation amount, and an execution unit configured to execute an oil recovery mode for recovery of the lubricating oil in the battery heat exchanger when the determination unit determines that lubricating oil needs to be recovered.

According to the refrigeration cycle device described above, the controller includes the estimation unit configured to estimate the oil stagnation amount, which is an amount of lubricating oil accumulated in the battery heat exchanger in accordance with execution of the non-battery mode; the determination unit configured to determine whether or not lubricating oil in the battery heat exchanger needs to be recovered on the basis of an oil stagnation amount; and the execution unit configured to execute the oil recovery mode for recovery of the lubricating oil in the battery heat exchanger when the determination unit determines that lubricating oil needs to be recovered. Therefore, oil stagnation in the battery heat exchanger caused by execution of the non-battery mode can be detected and eliminated. Accordingly, it is possible to provide the refrigeration cycle device that suppresses oil stagnation in the battery heat exchanger.

Embodiments of the present disclosure will be described hereafter referring to drawings. In the embodiments, a part or/and a relation part that corresponds to a function or/and structure described in a preceding embodiment may be assigned with the same reference numeral or different reference numeral different by the hundred or more. The description of the corresponding part or/and relation part may be omitted and may be referred to the other embodiment.

First Embodiment

In FIG. 1, a vehicle air-conditioning device 1 is mounted on a vehicle. The vehicle air-conditioning device 1 has an air-conditioning function for performing an air-conditioning operation in a vehicle compartment. The air-conditioning operation includes an operation of regulating a temperature of air inside the vehicle compartment, such as a cooling operation and a heating operation of the vehicle compartment. The air-conditioning operation includes an operation of regulating a humidity of air inside the vehicle compartment, such as a dehumidifying operation. In the air-conditioning operation, an air-conditioning duct 2 is used to cause air-conditioning wind to flow into the vehicle compartment to perform necessary air-conditioning of the vehicle compartment.

The vehicle air-conditioning device 1 has an object-cooling function for performing an object-cooling operation of cooling a cooling target mounted in the vehicle compartment. The object-cooling operation includes an operation of cooling an electronic component such as a secondary battery 35, which is a heat generating component. The object-cooling operation includes an operation of cooling a heat medium, which is used for cooling a cooling target. In other words, the object-cooling operation includes an operation of directly cooling the cooling target and an operation of indirectly cooling the cooling target via the heat medium such as air. In the object-cooling operation, necessary cooling is performed by causing cooling air to flow to the cooling target by using a battery duct 3 that internally includes the secondary battery 35 that is the cooling target. The secondary battery 35 provides an example of a battery device. The battery device is not limited to the secondary battery 35, and a primary battery such as a fuel cell may be adopted.

The vehicle air-conditioning device 1 includes a common pipe 10, an interior pipe 20, and a battery pipe 30, the inside of which a refrigerant as a heat medium flows. The interior pipe 20 is a refrigerant pipe used when the air-conditioning operation such as the cooling operation in the vehicle compartment is performed. The battery pipe 30 is a refrigerant pipe used when the object-cooling operation of cooling the secondary battery 35 that is a cooling target is performed. The common pipe 10 is a refrigerant pipe that is used in common both when the air-conditioning operation is performed and when the object-cooling operation is performed.

In other words, the common pipe 10, the interior pipe 20, and the battery pipe 30 form a refrigerant flow path of a refrigeration cycle device 1r in the vehicle air-conditioning device 1. The common pipe 10 provides an example of a refrigerant pipe. The interior pipe 20 provides an example of a refrigerant pipe. The battery pipe 30 provides an example of a refrigerant pipe.

The common pipe 10 is provided with a compressor 11, a radiator 43, an exterior heat exchanger 13, and an accumulator 19. The compressor 11 is a device that suctions and compresses a gas-phase refrigerant to discharge the gas-phase refrigerant in a high-temperature and high-pressure state. The compressor 11 is an electric compressor that is driven using electric power. Therefore, on/off control of the compressor 11 and an operating frequency of the compressor 11 can be freely controlled. However, power may be obtained in conjunction with driving of an engine instead of the electric compressor.

The radiator 43 is a device that radiates heat of the gas-phase refrigerant having a high temperature and a high pressure to the surroundings. The radiator 43 includes two devices of a first radiator 43a and a second radiator 43b. The first radiator 43a of the radiator 43 is provided in the common pipe 10. The gas-phase refrigerant having heat radiated in the radiator 43 is reduced in temperature and condensed into a liquid phase. The exterior heat exchanger 13 is a device that exchanges heat between outside air and a refrigerant. In order to promote heat exchange in the exterior heat exchanger 13, a blower that sends air to the exterior heat exchanger 13 may be provided. The accumulator 19 is a device that separates a liquid-phase refrigerant and a gas-phase refrigerant. The gas-phase refrigerant separated by the accumulator 19 is suctioned into the compressor 11 and compressed.

To the common pipe 10, a bypass pipe 10p to bypass the exterior heat exchanger 13 is connected. The bypass pipe 10p is provided with a bypass on-off valve 15. The bypass on-off valve 15 is a valve device that controls an amount of refrigerant flowing through the bypass pipe 10p. The bypass on-off valve 15 provides an example of a switching valve.

The common pipe 10 is provided with an exterior expansion valve 12 on an upstream side of the exterior heat exchanger 13. The exterior expansion valve 12 is a decompression device that generates a pressure difference in a refrigerant before and after passing through the exterior expansion valve 12, to facilitate evaporation of the refrigerant. The exterior expansion valve 12 provides an example of a switching valve.

The common pipe 10 branches into a flow path connected to the interior pipe 20 or the battery pipe 30 and a flow path not connected to the interior pipe 20 nor the battery pipe 30. In the common pipe 10, a bypass check valve 14 is provided in the flow path connected to the interior pipe 20 or the battery pipe 30. The bypass check valve 14 is a valve device that prevents the refrigerant having flowed through the bypass pipe 10p from flowing backward without flowing to the interior pipe 20 or the battery pipe 30. In the common pipe 10, an in-parallel on-off valve 18 is provided in the flow path not connected to the interior pipe 20 nor the battery pipe 30. The in-parallel on-off valve 18 is a valve device that switches whether or not to allow a refrigerant having flowed through the exterior heat exchanger 13 to directly flow to the accumulator 19. The in-parallel on-off valve 18 provides an example of a switching valve.

The interior pipe 20 is provided with an interior on-off valve 21, an interior expansion valve 22, an interior heat exchanger 23, and an evaporating pressure regulating valve

29. The interior on-off valve 21 is a valve device that switches between a state where a refrigerant flows through the interior pipe 20 and a state where a refrigerant does not flow through the interior pipe 20. The interior expansion valve 22 is a valve device that expands a refrigerant flowing through the interior pipe 20. In other words, the interior expansion valve 22 is a decompression device that generates a pressure difference in a refrigerant before and after passing through the interior expansion valve 22, to facilitate evaporation of the refrigerant. The interior heat exchanger 23 is a device that exchanges heat between air blown into the vehicle compartment and a refrigerant. The interior heat exchanger 23 draws vaporization heat from surrounding air by evaporating the refrigerant inside. The interior heat exchanger 23 is used as a cooling source in the cooling operation. The evaporating pressure regulating valve 29 is a valve device that regulates an evaporating pressure of a refrigerant evaporated in the interior heat exchanger 23 so as not to decrease excessively. The interior on-off valve 21 provides an example of a switching valve. The interior expansion valve 22 provides an example of a switching valve.

An inside/outside air switching door 25 is provided most upstream of a flow of air-conditioning air, which is an inlet of the air-conditioning duct 2. The inside/outside air switching door 25 is a device that switches between taking in inside air and taking in outside air during the air-conditioning operation of the vehicle. When the air-conditioning operation is in an inside air circulation mode, the inside/outside air switching door 25 is switched such that the inside air side is opened, and the air-conditioning air circulates inside the vehicle compartment. Whereas, when the air-conditioning operation is in an outside air introducing mode, the inside/outside air switching door 25 is switched such that the outside air side is opened, and air is taken in from the outside of the vehicle compartment to flow in the vehicle compartment.

Between the inside/outside air switching door 25 and the interior heat exchanger 23 in the air-conditioning duct 2, an interior blower 26 is provided. The interior blower 26 is a device to send air-conditioning wind into the vehicle compartment. The interior blower 26 causes air to flow toward the interior heat exchanger 23 and the second radiator 43*b* described later.

The battery pipe 30 is provided with a battery expansion valve 32 and a battery heat exchanger 33. The battery expansion valve 32 is a valve device that expands a refrigerant flowing through the battery pipe 30. In other words, the battery expansion valve 32 is a decompression device that generates a pressure difference in a refrigerant before and after passing through the battery expansion valve 32, to facilitate evaporation of the refrigerant. The battery expansion valve 32 provides an example of a switching valve.

The battery heat exchanger 33 is a device that exchanges heat between a refrigerant and air blown to the secondary battery 35, which is a heat generating component. The battery heat exchanger 33 draws vaporization heat from surrounding air by evaporating the refrigerant inside. The battery heat exchanger 33 is used as a cooling source in the object-cooling operation. The battery heat exchanger 33 is a device that indirectly exchanges heat between the secondary battery 35 and the refrigerant. For the interior heat exchanger 23 and the battery heat exchanger 33, an evaporation temperature of the refrigerant can be set to temperatures different from each other. For the battery heat exchanger 33, the evaporation temperature is set lower than that for the interior heat exchanger 23.

The battery duct 3 has a shape in which air circulates inside. The battery duct 3 does not include an opening or the like for introducing outside air into the duct. Therefore, the battery duct 3 is provided with an air passage for cooling the cooling target by circulating inside air without actively introducing outside air. However, the battery duct 3 may include an opening to allow introduction of outside air.

Inside the battery duct 3, the battery heat exchanger 33, the secondary battery 35, and a battery blower 36 are provided. The secondary battery 35 functions as a battery that supplies electric power to the vehicle. The secondary battery 35 is a heat generating component in which particularly large heat is likely to be generated at a time of power supply for supplying electric power to the vehicle and at a time of charging for storing electric power by recovery of regenerative energy or electric power supply from the outside via a charger. The battery blower 36 is a device that sends cooling air subjected to heat exchange in the battery heat exchanger 33, toward the secondary battery 35.

The common pipe 10 includes a branch portion 10*b* that branches from the common pipe 10 into two refrigerant flow paths of the interior pipe 20 and the battery pipe 30. The common pipe 10 includes a merging portion 10*j* that joins from two refrigerant flow paths of the interior pipe 20 and the battery pipe 30 into the common pipe 10. A pressure loss in the battery pipe 30 including the battery expansion valve 32 and the like is larger than a pressure loss in the interior pipe 20 including the interior expansion valve 22 and the like. In other words, when the interior on-off valve 21 is in a full-open state, the refrigerant flows through the interior pipe 20. Whereas, when the interior on-off valve 21 is in a full-closed state, the refrigerant flows through the battery pipe 30. In a half-open state where the interior on-off valve 21 has an opening degree between fully open and fully closed, the refrigerant can be controlled to flow through both the interior pipe 20 and the battery pipe 30.

The vehicle air-conditioning device 1 includes an air-conditioning water pipe 40 through which air-conditioning water as a heat medium flows. The air-conditioning water pipe 40 is a pipe used when the air-conditioning operation such as the heating operation in the vehicle compartment is performed. The air-conditioning water pipe 40 is a pipe independent from the refrigerant pipes of the common pipe 10, the interior pipe 20, and the battery pipe 30 constituting the refrigeration cycle device 1*r*. The air-conditioning water pipe 40 forms an air-conditioning water flow path, which is a flow path through which the air-conditioning water flows.

The air-conditioning water pipe 40 is provided with an air-conditioning water pump 41 and the radiator 43. The air-conditioning water pump 41 is a device that causes air-conditioning water to flow through the air-conditioning water pipe 40. The radiator 43 includes the first radiator 43*a* and the second radiator 43*b*. The first radiator 43*a* is a heat exchanger that exchanges heat between a refrigerant compressed by the compressor 11 and the air-conditioning water. By the heat exchange in the first radiator 43*a*, the air-conditioning water is heated. The second radiator 43*b* is a device that exchanges heat between air blown into the vehicle compartment and the air-conditioning water. By the heat exchange in the second radiator 43*b*, surrounding air is heated. The second radiator 43*b* is used as a heating source in the heating operation.

The air-conditioning water pipe 40 may include a reservoir tank. The reservoir tank is a device that regulates a pressure such that a pressure in the air-conditioning water pipe 40 does not excessively increase even when a volume of air-conditioning water increases accompanying a temperature rise. The air-conditioning water pipe 40 may include a heater. The heater is a device that heats air-conditioning water circulating in the air-conditioning water pipe 40.

The vehicle air-conditioning device 1 has various operation modes regarding the air-conditioning operation. The modes of the air-conditioning operation include, for example, an exclusive cooling mode, an exclusive battery mode, a battery cooling mode, and an exclusive heating mode. The modes of the air-conditioning operation include, for example, an in-series dehumidifying-heating mode, an in-parallel dehumidifying-heating mode, an in-series battery heating mode, and an in-parallel battery heating mode. The modes of the air-conditioning operation include, for example, an in-series dehumidifying-heating battery mode and an in-parallel dehumidifying-heating battery mode. Each mode of the air-conditioning operation will be described in detail later.

Each mode can be classified into either a battery mode or a non-battery mode. The battery mode is a mode in which the secondary battery 35 is cooled. Whereas, the non-battery mode is a mode in which the secondary battery 35 is not cooled. Each mode can be classified into either a heating mode or a non-heating mode. The heating mode is a mode in which the inside of the vehicle compartment is heated. The non-heating mode is a mode in which the inside of the vehicle compartment is not heated.

Figure 2:
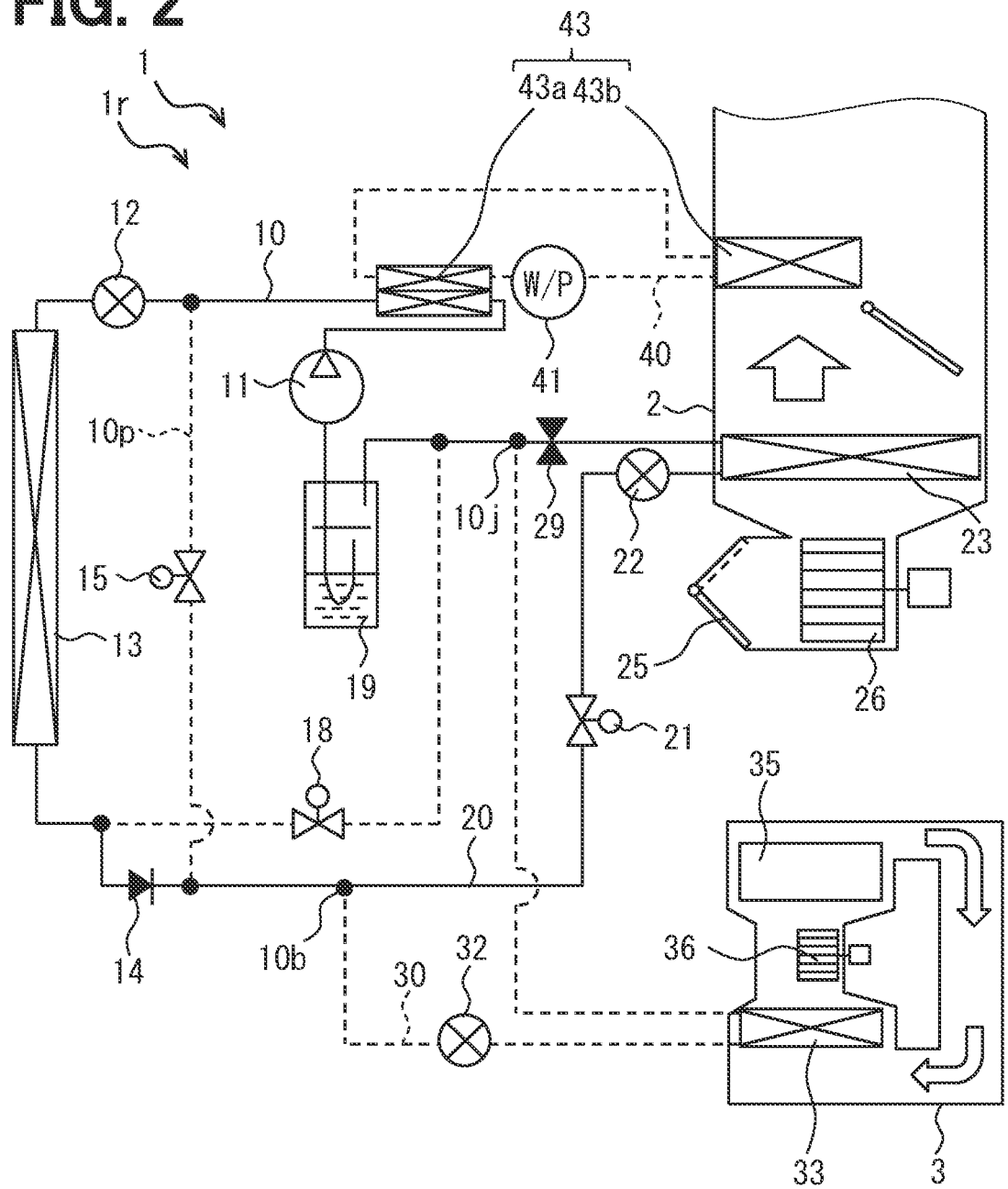
FIG. 2 is an explanatory diagram illustrating a flow of a heat medium in an exclusive cooling mode.

An operation of the vehicle air-conditioning device 1 when the exclusive cooling mode is executed will be described below. In FIG. 2, a portion where a heat medium such as a refrigerant or air-conditioning water flows is indicated by a solid line, and a portion where the heat medium does not flow is indicated by a broken line. In the exclusive cooling mode, the compressor 11 is driven in a state where the bypass on-off valve 15 and the in-parallel on-off valve 18 are closed and the interior on-off valve 21 is opened. In the exclusive cooling mode, the interior blower 26 is driven, and the battery blower 36 and the air-conditioning water pump 41 are stopped.

In the exclusive cooling mode, a gas-phase refrigerant compressed by the compressor 11 flows through the first radiator 43*a*, the exterior expansion valve 12, and the exterior heat exchanger 13 in this order. In the first radiator 43*a* and the exterior heat exchanger 13, the refrigerant is reduced in temperature and condensed into a liquid-phase refrigerant. The condensed liquid-phase refrigerant expands at the interior expansion valve 22 to be reduced in temperature and pressure, and is evaporated in the interior heat exchanger 23. The evaporated gas-phase refrigerant flows into the accumulator 19 and is compressed again by the compressor 11.

In the exclusive cooling mode, since the air-conditioning water pump 41 is stopped, the air-conditioning water is not circulated to the second radiator 43*b*, and the heating function is not exhibited. In the exclusive cooling mode, since the interior on-off valve 21 is opened, the refrigerant is hardly circulated to the battery heat exchanger 33, and the battery-cooling function is not exhibited. In summary, the exclusive cooling mode is a mode for performing only cooling without performing heating and battery-cooling. The exclusive cooling mode provides an example of the non-battery mode. The exclusive cooling mode provides an example of the non-heating mode.

Figure 3:
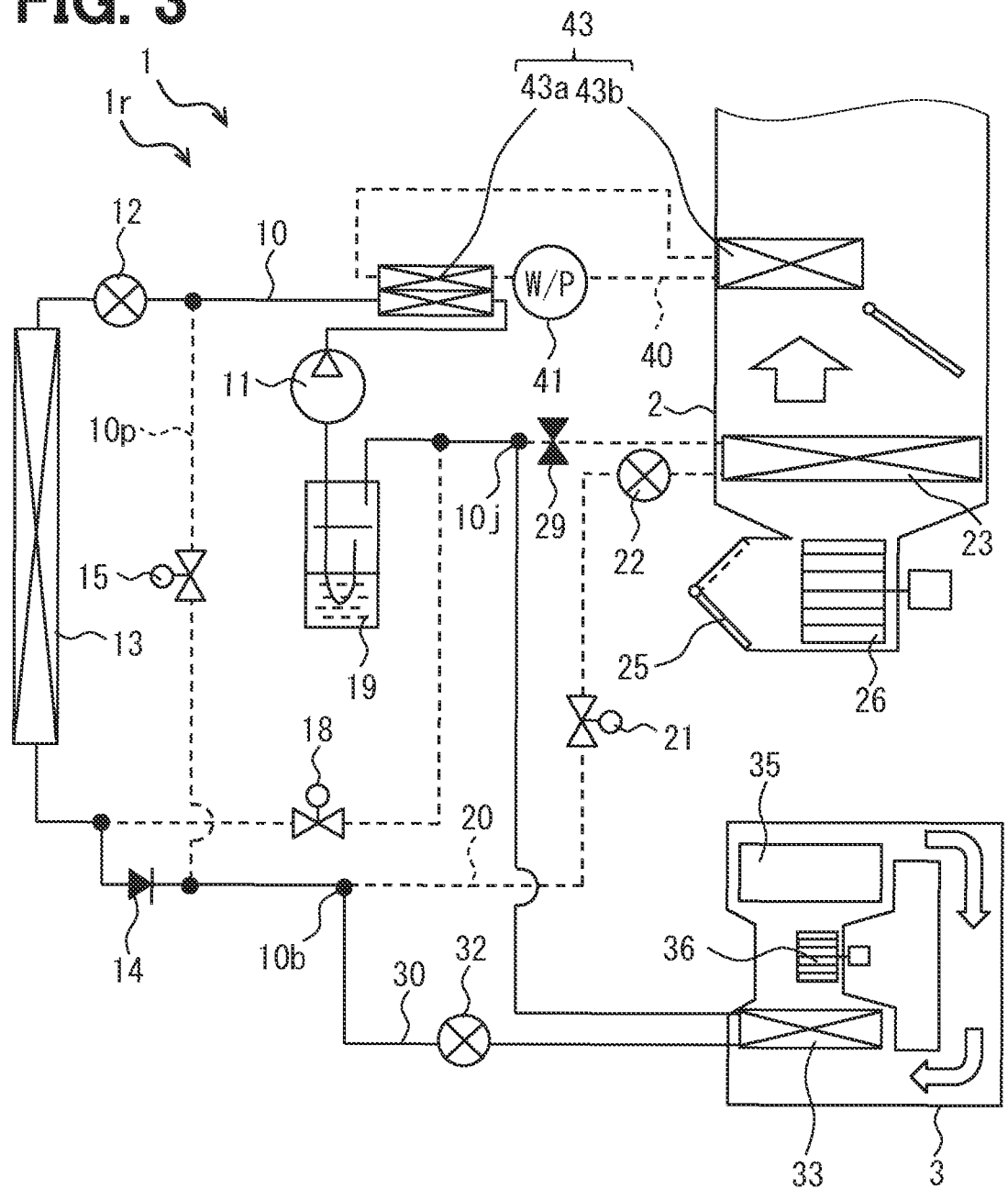
FIG. 3 is an explanatory diagram illustrating a flow of a heat medium in an exclusive battery mode.

An operation of the vehicle air-conditioning device 1 when the exclusive battery mode is executed will be described below. In FIG. 3, a portion where a heat medium such as a refrigerant or air-conditioning water flows is indicated by a solid line, and a portion where the heat medium does not flow is indicated by a broken line. In the exclusive battery mode, the compressor 11 is driven in a state where the bypass on-off valve 15, the in-parallel on-off valve 18, and the interior on-off valve 21 are closed. In the exclusive battery mode, the battery blower 36 is driven, and the interior blower 26 and the air-conditioning water pump 41 are stopped.

In the exclusive battery mode, a gas-phase refrigerant compressed by the compressor 11 flows through the first radiator 43*a*, the exterior expansion valve 12, and the exterior heat exchanger 13 in this order. In the first radiator 43*a* and the exterior heat exchanger 13, the refrigerant is reduced in temperature and condensed into a liquid-phase refrigerant. The condensed liquid-phase refrigerant expands at the battery expansion valve 32 to be reduced in temperature and pressure, and is evaporated in the battery heat exchanger 33. The evaporated gas-phase refrigerant flows into the accumulator 19 and is compressed again by the compressor 11.

In the exclusive battery mode, since the air-conditioning water pump 41 is stopped, the air-conditioning water is not circulated to the second radiator 43*b*, and the heating function is not exhibited. In the exclusive battery mode, since the interior on-off valve 21 is closed, the refrigerant is not circulated to the interior heat exchanger 23, and the cooling function is not exhibited. In summary, the exclusive battery mode is a mode for performing only battery-cooling without performing cooling and heating. The exclusive battery mode provides an example of the battery mode. The exclusive battery mode provides an example of the non-heating mode.

Figure 4:
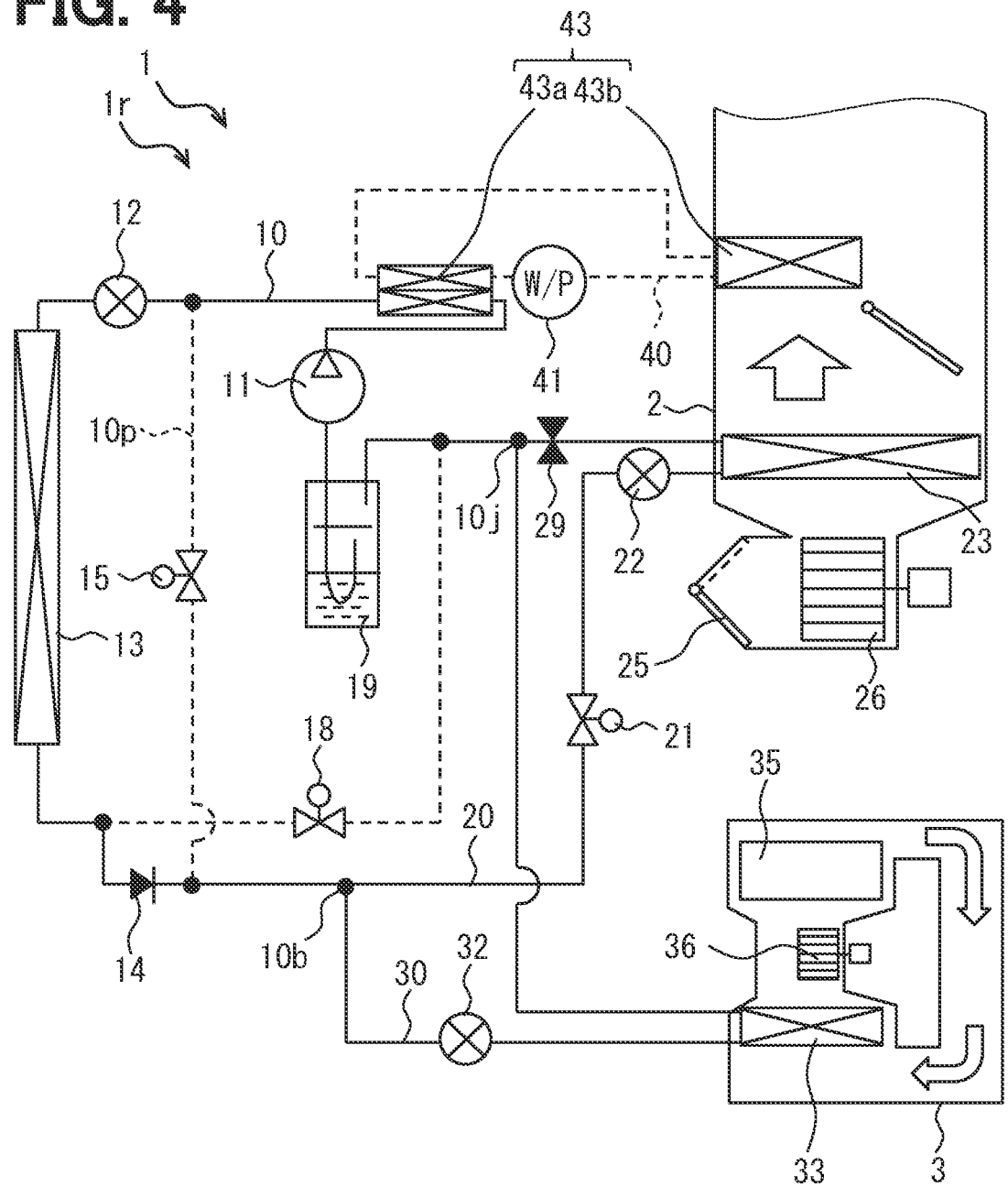
FIG. 4 is an explanatory diagram illustrating a flow of a heat medium in a battery cooling mode.

An operation of the vehicle air-conditioning device 1 when the battery cooling mode is executed will be described below. In FIG. 4, a portion where a heat medium such as a refrigerant or air-conditioning water flows is indicated by a solid line, and a portion where the heat medium does not flow is indicated by a broken line. In the battery cooling mode, the compressor 11 is driven in a state where the bypass on-off valve 15 and the in-parallel on-off valve 18 are closed, and the interior on-off valve 21 is half-opened. In the battery cooling mode, the interior blower 26 and the battery blower 36 are driven, and the air-conditioning water pump 41 is stopped.

In the battery cooling mode, a gas-phase refrigerant compressed by the compressor 11 flows through the first radiator 43*a*, the exterior expansion valve 12, and the exterior heat exchanger 13 in this order. In the first radiator 43*a* and the exterior heat exchanger 13, the refrigerant is reduced in temperature and condensed into a liquid-phase refrigerant. The condensed liquid-phase refrigerant is divided into a refrigerant flowing into the interior pipe 20 and a refrigerant flowing into the battery pipe 30, at the branch portion 10*b*. The refrigerant having flowed into the interior pipe 20 expands at the interior expansion valve 22 to be reduced in temperature and pressure, and is evaporated in the interior heat exchanger 23. Whereas, the refrigerant having flowed into the battery pipe 30 expands at the battery expansion valve 32 to be reduced in temperature and pressure, and is evaporated in the battery heat exchanger 33. The gas-phase refrigerants evaporated in the interior heat exchanger 23 and the battery heat exchanger 33 merge at the merging portion 10*j*, then flow into the accumulator 19, and are compressed again by the compressor 11.

In the battery cooling mode, since the air-conditioning water pump 41 is stopped, the air-conditioning water is not circulated to the second radiator 43*b*, and the heating function is not exhibited. In summary, the battery cooling mode is a mode for simultaneously performing cooling and battery-cooling without performing heating. The battery cooling mode provides an example of the battery mode. The battery cooling mode provides an example of the non-heating mode.

Figure 5:
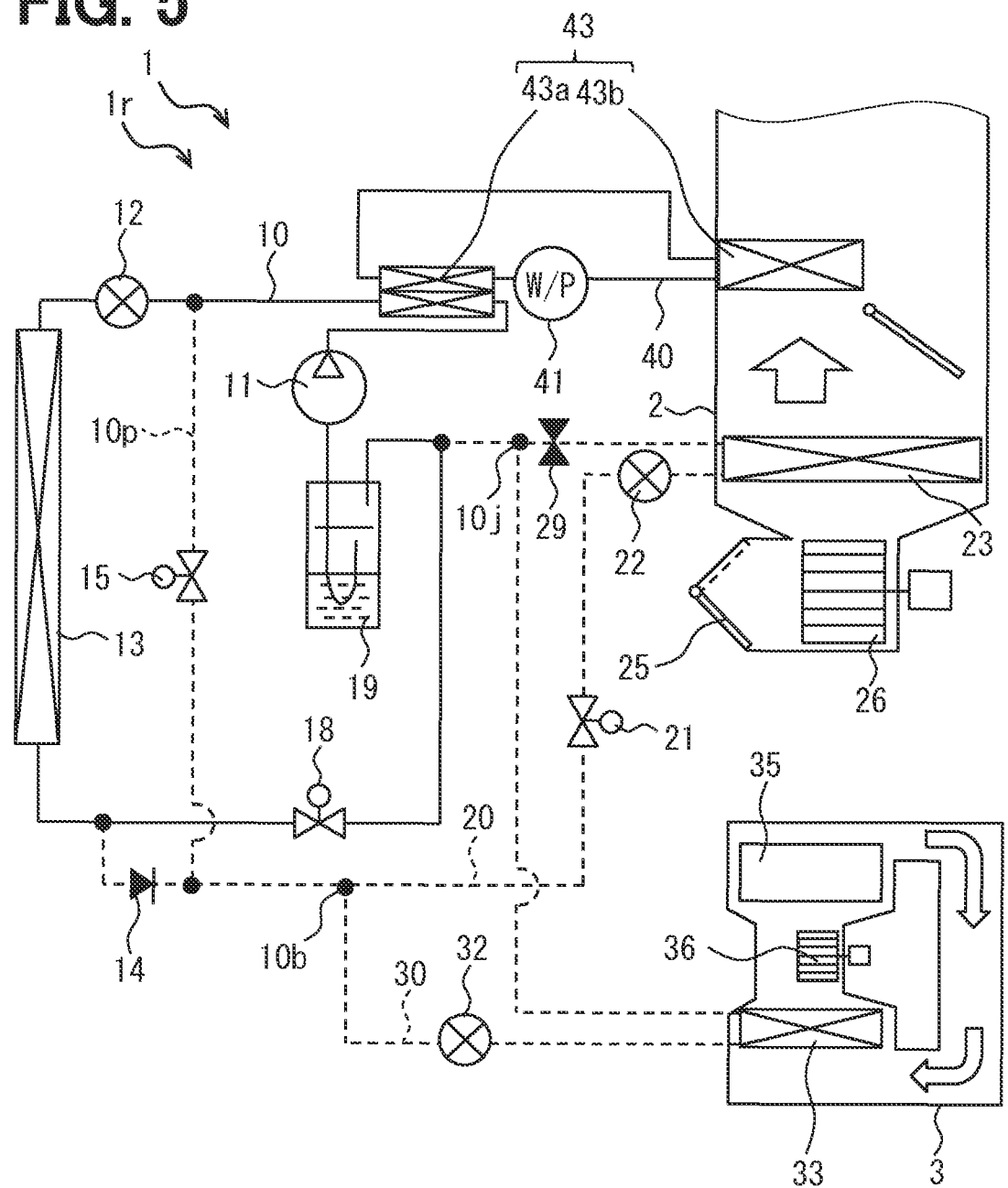
FIG. 5 is an explanatory diagram illustrating a flow of a heat medium in an exclusive heating mode.

An operation of the vehicle air-conditioning device 1 when the exclusive heating mode is executed will be described below. In FIG. 5, a portion where a heat medium such as a refrigerant or air-conditioning water flows is indicated by a solid line, and a portion where the heat medium does not flow is indicated by a broken line. In the exclusive heating mode, the compressor 11 is driven in a state where the bypass on-off valve 15 and the interior on-off valve 21 are closed and the in-parallel on-off valve 18 is opened. In the exclusive heating mode, the interior blower 26 and the air-conditioning water pump 41 are driven, and the battery blower 36 is stopped.

In the exclusive heating mode, a gas-phase refrigerant compressed by the compressor 11 is reduced in temperature and condensed by exchanging heat with air-conditioning water in the first radiator 43*a*. The condensed liquid-phase refrigerant expands at the exterior expansion valve 12 to be reduced in temperature and pressure, and is evaporated in the exterior heat exchanger 13. The evaporated gas-phase refrigerant flows into the accumulator 19 and is compressed again by the compressor 11. In the exclusive heating mode, since the air-conditioning water pump 41 is driven, air-conditioning water circulates through the air-conditioning water pipe 40. In other words, in the exclusive heating mode, the first radiator 43*a* and the second radiator 43*b* indirectly exchange heat between the refrigerant and inside air via the air-conditioning water.

In the exclusive heating mode, since the in-parallel on-off valve 18 is opened, the refrigerant is not circulated to the interior heat exchanger 23 and the battery heat exchanger 33, and the cooling function and the battery-cooling function are not exhibited. In summary, the exclusive heating mode is a mode for performing only heating without performing cooling and battery-cooling. The exclusive heating mode provides an example of the non-battery mode. The exclusive heating mode provides an example of the heating mode.

Figure 6:
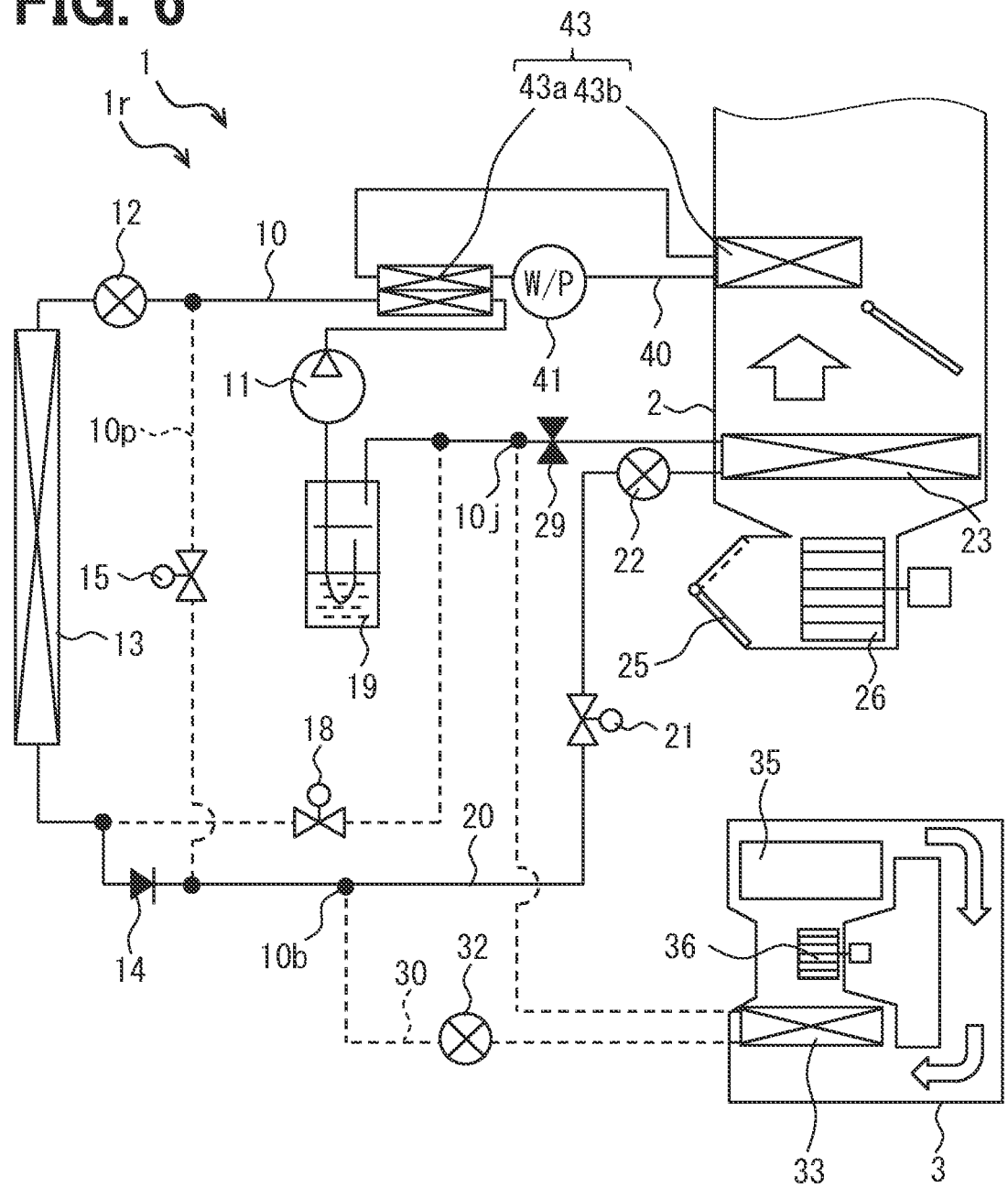
FIG. 6 is an explanatory diagram illustrating a flow of a heat medium in an in-series dehumidifying-heating mode.

An operation of the vehicle air-conditioning device 1 when the in-series dehumidifying-heating mode is executed will be described below. In FIG. 6, a portion where a heat medium such as a refrigerant or air-conditioning water flows is indicated by a solid line, and a portion where the heat medium does not flow is indicated by a broken line. In the in-series dehumidifying-heating mode, the compressor 11 is driven in a state where the bypass on-off valve 15 and the in-parallel on-off valve 18 are closed and the interior on-off valve 21 is opened. In the in-series dehumidifying-heating mode, the interior blower 26 and the air-conditioning water pump 41 are driven, and the battery blower 36 is stopped.

In the in-series dehumidifying-heating mode, a gas-phase refrigerant compressed by the compressor 11 flows through the first radiator 43*a*, the exterior expansion valve 12, and the exterior heat exchanger 13 in this order. In the first radiator 43*a* and the exterior heat exchanger 13, the refrigerant is reduced in temperature and condensed into a liquid-phase refrigerant. The condensed liquid-phase refrigerant expands at the interior expansion valve 22 to be reduced in temperature and pressure, and is evaporated in the interior heat exchanger 23. The evaporated gas-phase refrigerant flows into the accumulator 19 and is compressed again by the compressor 11.

In the in-series dehumidifying-heating mode, since the air-conditioning water pump 41 is driven, air-conditioning water circulates through the air-conditioning water pipe 40. In other words, in the in-series dehumidifying-heating mode, the first radiator 43*a* and the second radiator 43*b* indirectly exchange heat between the refrigerant and inside air via the air-conditioning water. In the in-series dehumidifying-heating mode, since the interior heat exchanger 23 has a low temperature and the second radiator 43*b* has a high temperature, air is cooled inside the air-conditioning duct 2 and then heated. In other words, in the in-series dehumidifying-heating mode, air dehumidified by the interior heat exchanger 23 and heated by the second radiator 43*b* is blown into the vehicle compartment.

In the in-series dehumidifying-heating mode, since the interior on-off valve 21 is opened, the refrigerant is not circulated to the battery heat exchanger 33, and the battery-cooling function is not exhibited. In summary, the in-series dehumidifying-heating mode is a mode for performing only dehumidifying and heating without performing battery-cooling. The in-series dehumidifying-heating mode provides an example of the non-battery mode. The in-series dehumidifying-heating mode provides an example of the heating mode.

Figure 7:
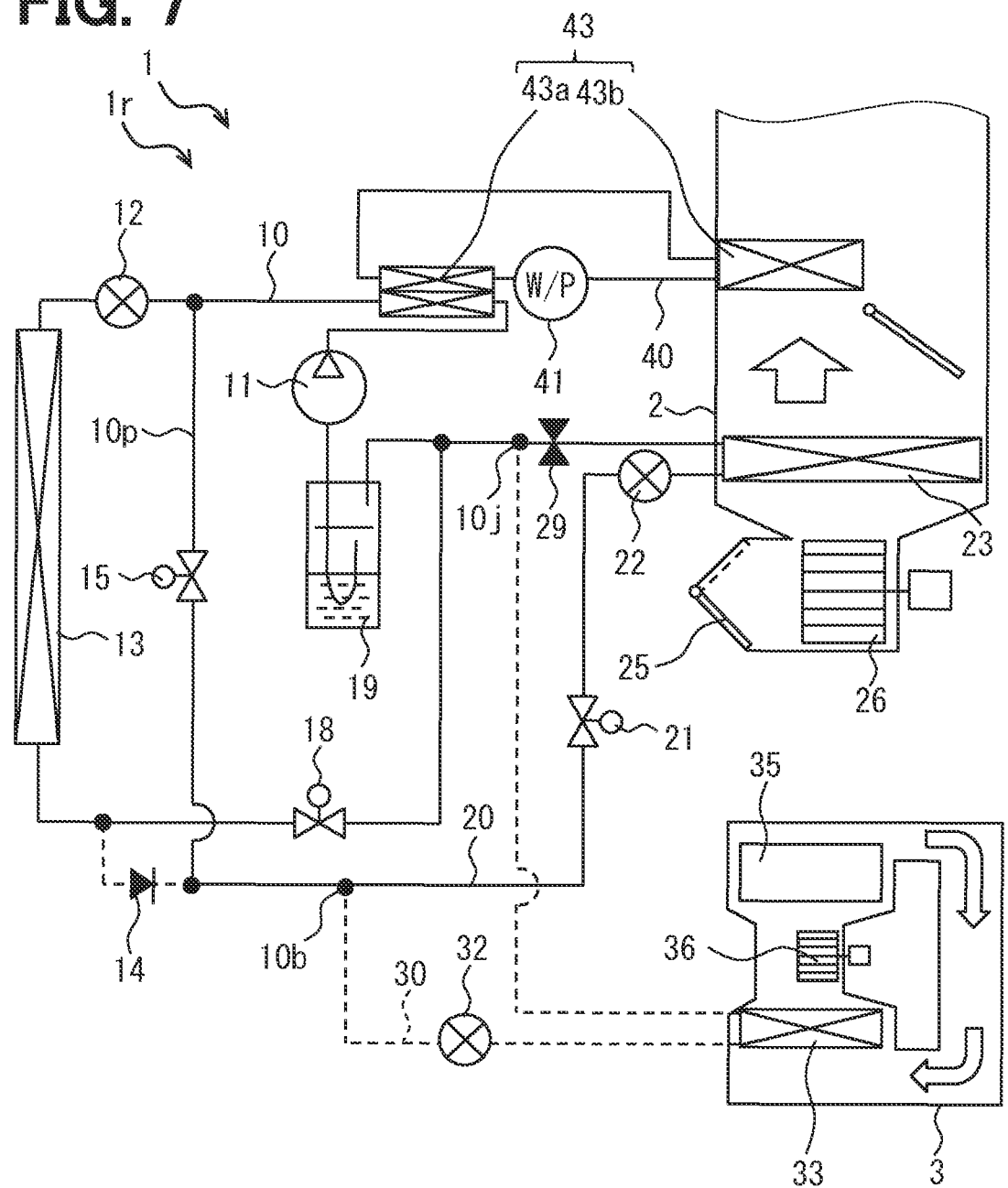
FIG. 7 is an explanatory diagram illustrating a flow of a heat medium in an in-parallel dehumidifying-heating mode.

An operation of the vehicle air-conditioning device 1 when the in-parallel dehumidifying-heating mode is executed will be described below. In FIG. 7, a portion where a heat medium such as a refrigerant or air-conditioning water flows is indicated by a solid line, and a portion where the heat medium does not flow is indicated by a broken line. In the in-parallel dehumidifying-heating mode, the compressor 11 is driven in a state where the bypass on-off valve 15, the in-parallel on-off valve 18, and the interior on-off valve 21 are opened. In the in-parallel dehumidifying-heating mode, the interior blower 26 and the air-conditioning water pump 41 are driven, and the battery blower 36 is stopped.

In the in-parallel dehumidifying-heating mode, a gas-phase refrigerant compressed by the compressor 11 is reduced in temperature and condensed by exchanging heat with air-conditioning water in the first radiator 43*a*. The condensed liquid-phase refrigerant is divided into a refrigerant flowing into the bypass pipe 10*p* and a refrigerant not flowing through the bypass pipe 10*p*. The refrigerant not flowing through the bypass pipe 10*p* expands at the exterior expansion valve 12 to be reduced in temperature and pressure, and is evaporated in the exterior heat exchanger 13. The gas-phase refrigerant evaporated at the exterior heat exchanger 13 flows into the accumulator 19 and is compressed again by the compressor 11. Whereas, the refrigerant flowing through the bypass pipe 10*p* expands at the interior expansion valve 22 to be reduced in temperature and pressure, and is evaporated in the interior heat exchanger 23. The gas-phase refrigerant evaporated at the interior heat exchanger 23 flows into the accumulator 19 and is compressed again by the compressor 11.

In the in-parallel dehumidifying-heating mode, since the air-conditioning water pump 41 is driven, air-conditioning water circulates through the air-conditioning water pipe 40. In other words, in the in-parallel dehumidifying-heating mode, the first radiator 43*a* and the second radiator 43*b* indirectly exchange heat between the refrigerant and inside air via the air-conditioning water. In the in-parallel dehumidifying-heating mode, since the interior heat exchanger 23 has a low temperature and the second radiator 43*b* has a high temperature, air is cooled inside the air-conditioning duct 2 and then heated. In other words, in the in-parallel dehumidifying-heating mode, air dehumidified by the interior heat exchanger 23 and heated by the second radiator 43*b* is blown into the vehicle compartment.

In the in-parallel dehumidifying-heating mode, since the interior on-off valve 21 is opened, the refrigerant is not circulated to the battery heat exchanger 33, and the battery-cooling function is not exhibited. In summary, the in-parallel dehumidifying-heating mode is a mode for performing only dehumidifying and heating without performing battery-cooling. The in-parallel dehumidifying-heating mode provides an example of the non-battery mode. The in-parallel dehumidifying-heating mode provides an example of the heating mode.

Between the in-series dehumidifying-heating mode and the in-parallel dehumidifying-heating mode, a pressure difference between the branch portion 10b and the merging portion 10j is different. More specifically, in the in-series dehumidifying-heating mode, the pressure difference between the branch portion 10b and the merging portion 10j tends to be large. Whereas, in the in-parallel dehumidifying-heating mode, the pressure difference between the branch portion 10b and the merging portion 10j tends to be small. In other words, in the in-series dehumidifying-heating mode, a pressure difference between an upstream side and a downstream side of the battery pipe 30 tends to be larger than that in the in-parallel dehumidifying-heating mode.

Figure 8:
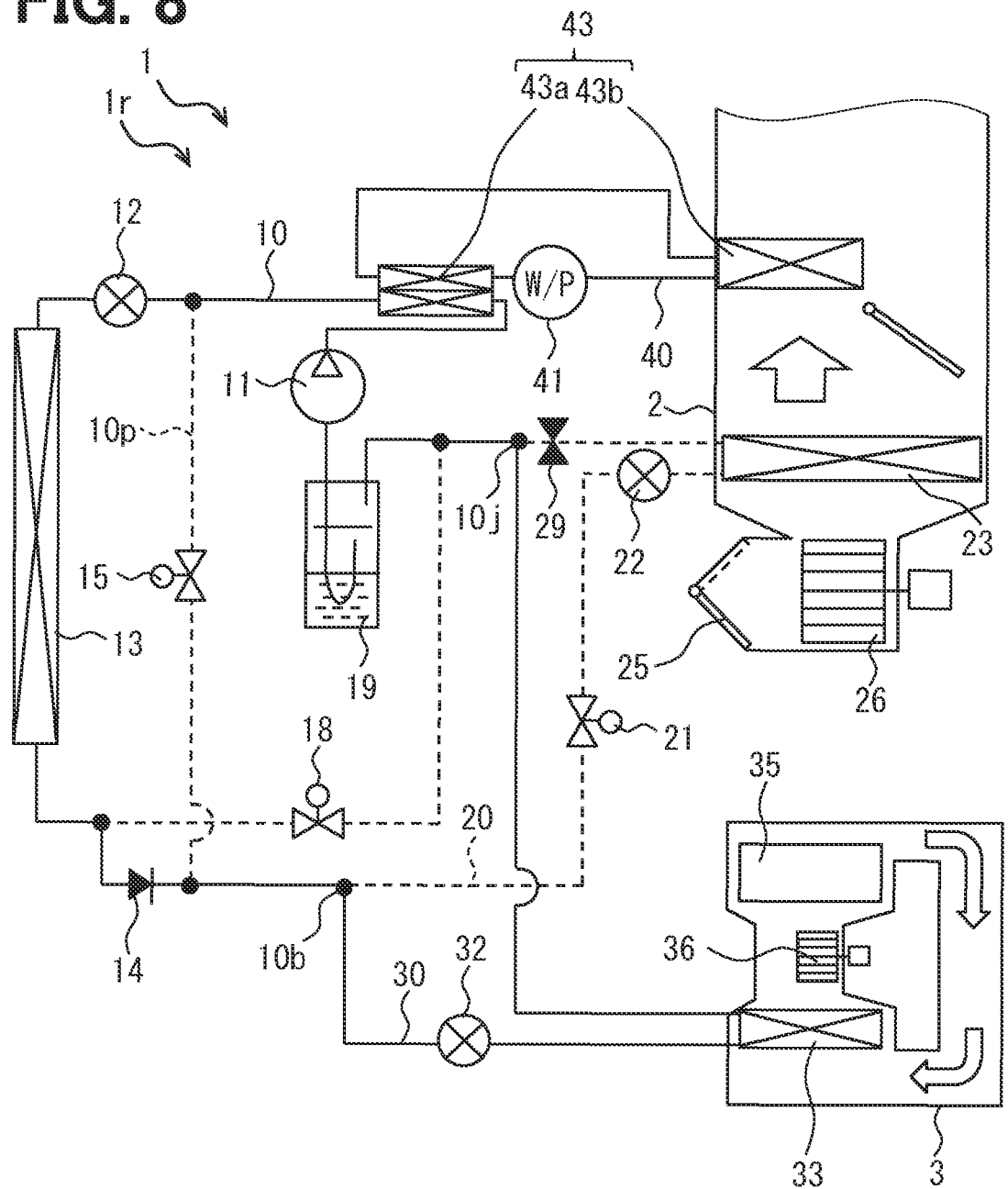
FIG. 8 is an explanatory diagram illustrating a flow of a heat medium in an in-series battery heating mode.

An operation of the vehicle air-conditioning device 1 when the in-series battery heating mode is executed will be described below. In FIG. 8, a portion where a heat medium such as a refrigerant or air-conditioning water flows is indicated by a solid line, and a portion where the heat medium does not flow is indicated by a broken line. In the in-series battery heating mode, the compressor 11 is driven in a state where the bypass on-off valve 15, the in-parallel on-off valve 18, and the interior on-off valve 21 are closed. In the in-series battery heating mode, the interior blower 26, the battery blower 36, and the air-conditioning water pump 41 are driven.

In the in-series battery heating mode, a gas-phase refrigerant compressed by the compressor 11 flows through the first radiator 43a, the exterior expansion valve 12, and the exterior heat exchanger 13 in this order. In the first radiator 43a and the exterior heat exchanger 13, the refrigerant is reduced in temperature and condensed into a liquid-phase refrigerant. The condensed liquid-phase refrigerant expands at the battery expansion valve 32 to be reduced in temperature and pressure, and is evaporated in the battery heat exchanger 33. The evaporated gas-phase refrigerant flows into the accumulator 19 and is compressed again by the compressor 11. In the in-series battery heating mode, since the air-conditioning water pump 41 is driven, air-conditioning water circulates through the air-conditioning water pipe 40. In other words, in the in-series battery heating mode, the first radiator 43a and the second radiator 43b indirectly exchange heat between the refrigerant and inside air via the air-conditioning water.

In the in-series battery heating mode, since the interior on-off valve 21 is closed, the refrigerant is not circulated to the interior heat exchanger 23, and the dehumidifying function is not exhibited. In summary, the in-series battery heating mode is a mode for performing heating and battery-cooling without dehumidifying. The in-series battery heating mode provides an example of the battery mode. The in-series battery heating mode provides an example of the heating mode.

Figure 9:
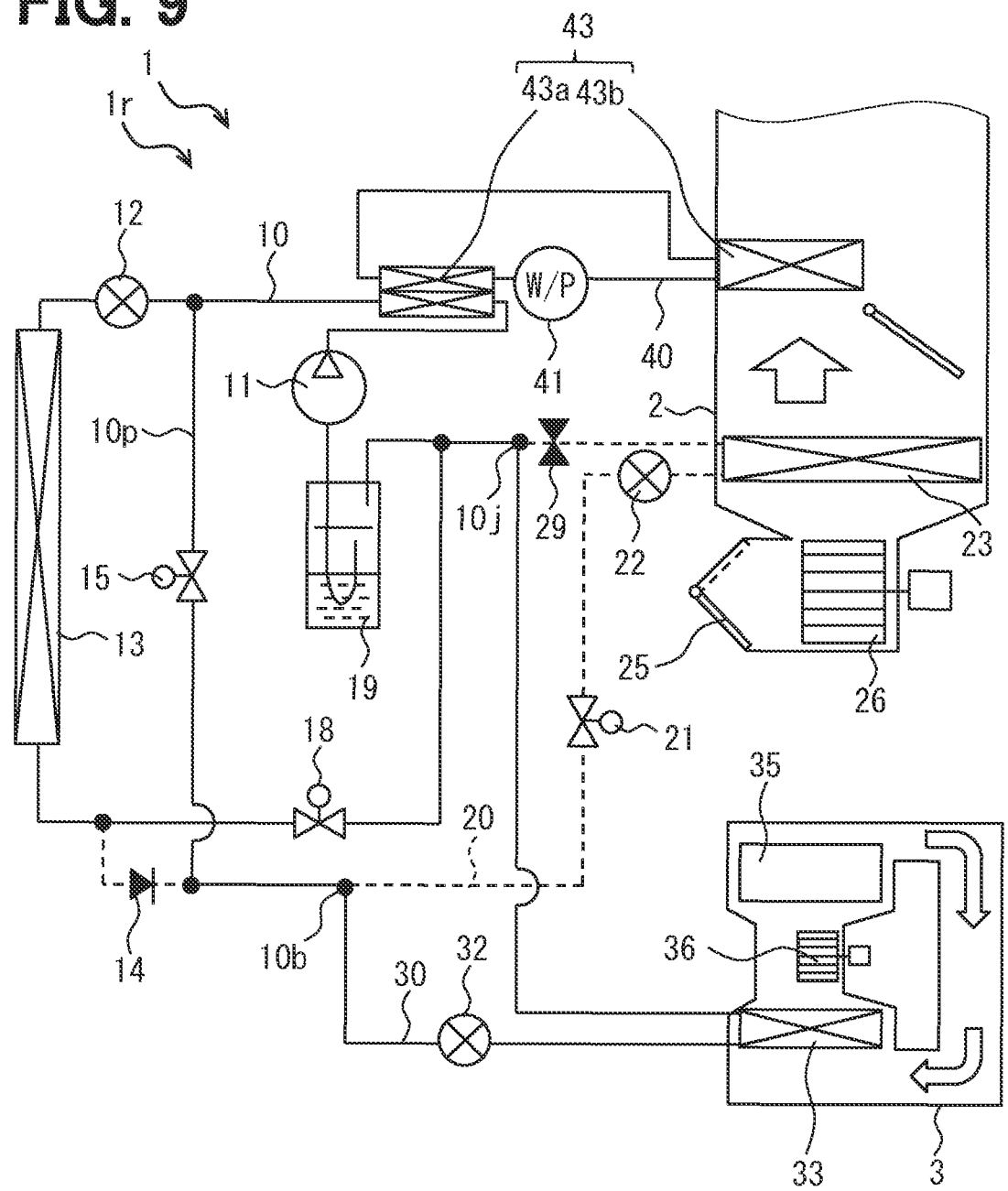
FIG. 9 is an explanatory diagram illustrating a flow of a heat medium in an in-parallel battery heating mode.

An operation of the vehicle air-conditioning device 1 when the in-parallel battery heating mode is executed will be described below. In FIG. 9, a portion where a heat medium such as a refrigerant or air-conditioning water flows is indicated by a solid line, and a portion where the heat medium does not flow is indicated by a broken line. In the in-parallel battery heating mode, the compressor 11 is driven in a state where the interior on-off valve 21 is closed, and the bypass on-off valve 15 and the in-parallel on-off valve 18 are opened. In the in-parallel battery heating mode, the interior blower 26, the air-conditioning water pump 41, and the battery blower 36 are driven.

In the in-parallel battery heating mode, a gas-phase refrigerant compressed by the compressor 11 is reduced in temperature and condensed by exchanging heat with air-conditioning water in the first radiator 43a. The condensed liquid-phase refrigerant is divided into a refrigerant flowing into the bypass pipe 10p and a refrigerant not flowing through the bypass pipe 10p. The refrigerant not flowing through the bypass pipe 10p expands at the exterior expansion valve 12 to be reduced in temperature and pressure, and is evaporated in the exterior heat exchanger 13. The gas-phase refrigerant evaporated at the exterior heat exchanger 13 flows into the accumulator 19 and is compressed again by the compressor 11. Whereas, the refrigerant flowing through the bypass pipe 10p expands at the interior expansion valve 22 to be reduced in temperature and pressure, and is evaporated in the interior heat exchanger 23. The gas-phase refrigerant evaporated at the interior heat exchanger 23 flows into the accumulator 19 and is compressed again by the compressor 11.

In the in-parallel battery heating mode, since the air-conditioning water pump 41 is driven, air-conditioning water circulates through the air-conditioning water pipe 40. In other words, in the in-parallel battery heating mode, the first radiator 43a and the second radiator 43b indirectly exchange heat between the refrigerant and inside air via the air-conditioning water. In the in-parallel battery heating mode, since the interior on-off valve 21 is closed, the refrigerant is not circulated to the interior heat exchanger 23, and the dehumidifying function is not exhibited. In summary, the in-parallel battery heating mode is a mode for performing heating and battery-cooling without dehumidifying. The in-parallel battery heating mode provides an example of the battery mode. The in-parallel battery heating mode provides an example of the heating mode.

Between the in-series battery heating mode and the in-parallel battery heating mode, an amount of the refrigerant flowing through the battery heat exchanger 33 is different. More specifically, in the in-series battery heating mode, the refrigerant sent by the compressor 11 entirely flows through the battery heat exchanger 33. Whereas, in the in-parallel battery heating mode, a part of the refrigerant sent by the compressor 11 flows through the battery heat exchanger 33. In other words, in the in-series battery heating mode, the amount of the refrigerant flowing through the battery heat exchanger 33 tends to be larger than that in the in-parallel battery heating mode.

Figure 10:
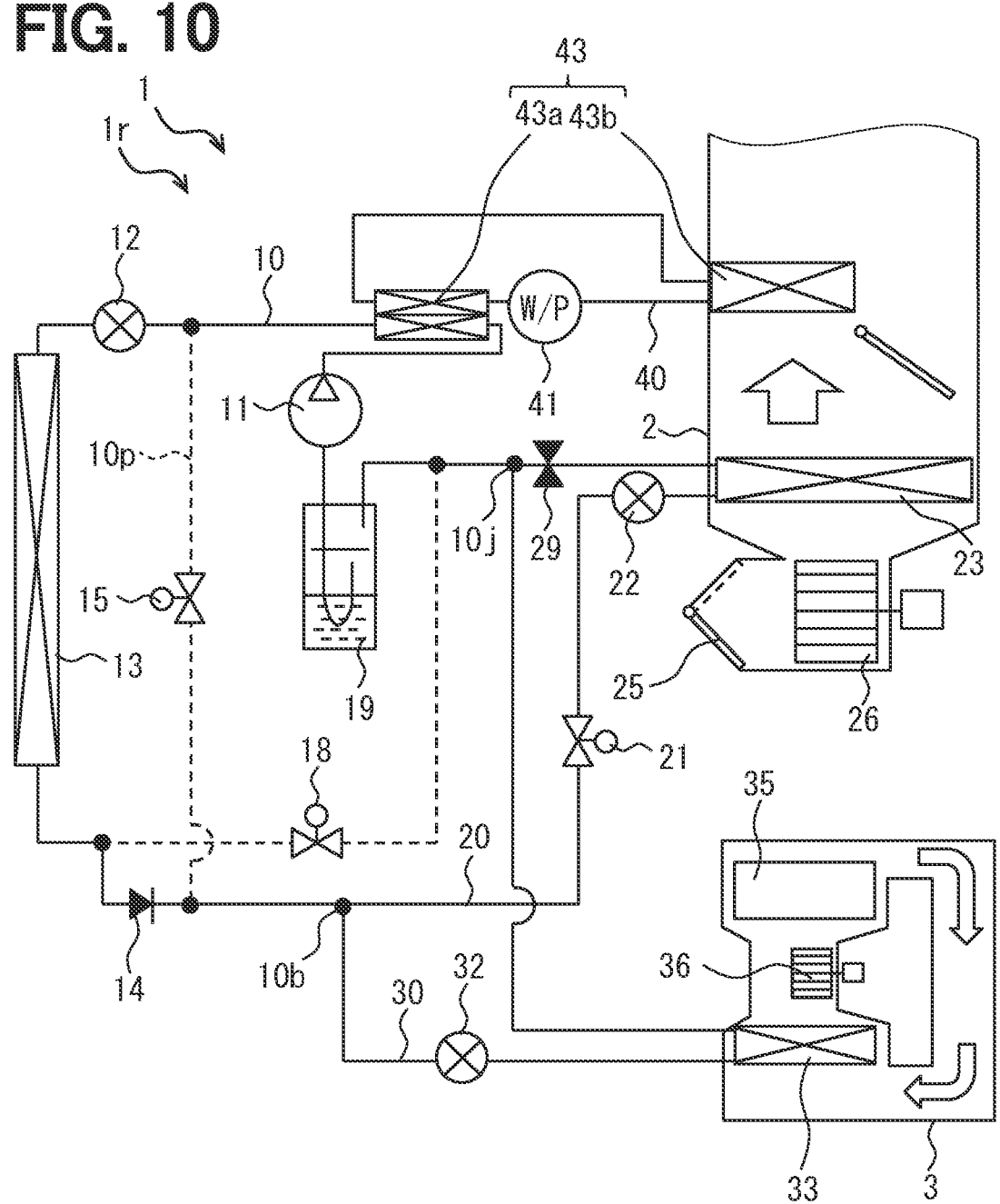
FIG. 10 is an explanatory diagram illustrating a flow of a heat medium in an in-series dehumidifying-heating battery mode.

An operation of the vehicle air-conditioning device 1 when the in-series dehumidifying-heating battery mode is executed will be described below. In FIG. 10, a portion where a heat medium such as a refrigerant or air-conditioning water flows is indicated by a solid line, and a portion where the heat medium does not flow is indicated by a broken line. In the in-series dehumidifying-heating battery mode, the compressor 11 is driven in a state where the bypass on-off valve 15 and the in-parallel on-off valve 18 are closed, and the interior on-off valve 21 is half-opened. In the in-series dehumidifying-heating battery mode, the interior blower 26, the battery blower 36, and the air-conditioning water pump 41 are driven.

In the in-series dehumidifying-heating battery mode, a gas-phase refrigerant compressed by the compressor 11 flows through the first radiator 43a, the exterior expansion valve 12, and the exterior heat exchanger 13 in this order. In the first radiator 43a and the exterior heat exchanger 13, the refrigerant is reduced in temperature and condensed into a liquid-phase refrigerant. The condensed liquid-phase refrigerant is divided into a refrigerant flowing into the interior pipe 20 and a refrigerant flowing into the battery pipe 30, at the branch portion 10b. The refrigerant having flowed into the interior pipe 20 expands at the interior expansion valve 22 to be reduced in temperature and pressure, and is evaporated in the interior heat exchanger 23. Whereas, the refrigerant having flowed into the battery pipe 30 expands at the battery expansion valve 32 to be reduced in temperature and pressure, and is evaporated in the battery heat exchanger 33. The gas-phase refrigerants evaporated in the interior heat exchanger 23 and the battery heat exchanger 33 merge at the merging portion 10j, then flow into the accumulator 19, and are compressed again by the compressor 11.

In the in-series dehumidifying-heating battery mode, since the air-conditioning water pump 41 is driven, air-conditioning water circulates through the air-conditioning water pipe 40. In other words, in the in-series dehumidifying-heating battery mode, the first radiator 43a and the second radiator 43b indirectly exchange heat between the refrigerant and inside air via the air-conditioning water. The in-series dehumidifying-heating battery mode is a mode for simultaneously performing dehumidifying-heating and battery-cooling. The in-series dehumidifying-heating battery mode provides an example of the battery mode. The in-series dehumidifying-heating battery mode provides an example of the heating mode.

Figure 11:
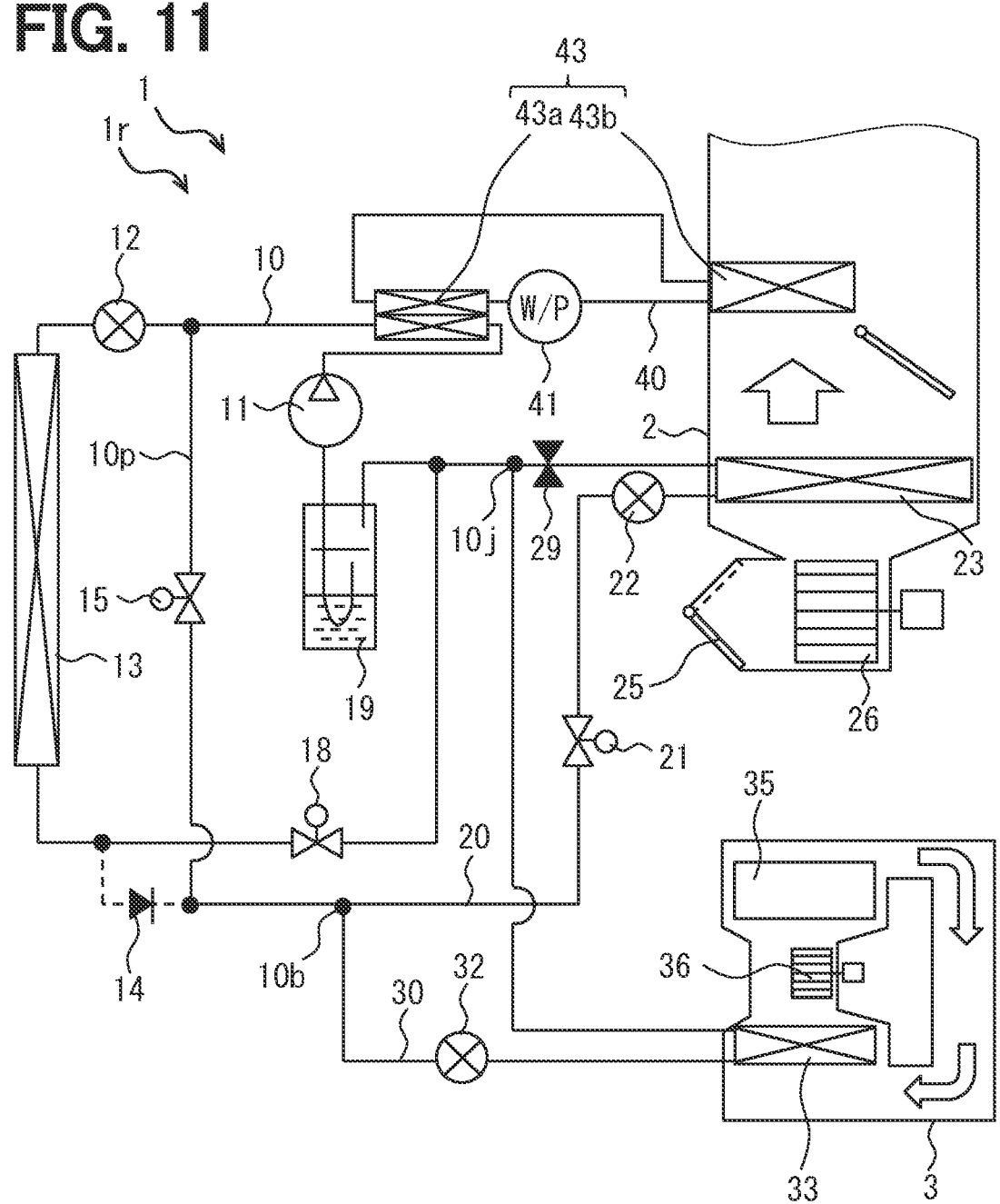
FIG. 11 is an explanatory diagram illustrating a flow of a heat medium in an in-parallel dehumidifying-heating battery mode.

An operation of the vehicle air-conditioning device 1 when the in-parallel dehumidifying-heating battery mode is executed will be described below. In FIG. 11, a portion where a heat medium such as a refrigerant or air-conditioning water flows is indicated by a solid line, and a portion where the heat medium does not flow is indicated by a broken line. In the in-parallel dehumidifying-heating battery mode, the compressor 11 is driven in a state where the interior on-off valve 21 is half-opened, and the bypass on-off valve 15 and the in-parallel on-off valve 18 are opened. In the in-parallel dehumidifying-heating battery mode, the interior blower 26, the air-conditioning water pump 41, and the battery blower 36 are driven.

In the in-parallel dehumidifying-heating battery mode, a gas-phase refrigerant compressed by the compressor 11 is reduced in temperature and condensed by exchanging heat with air-conditioning water in the first radiator 43a. The condensed liquid-phase refrigerant is divided into a refrigerant flowing into the bypass pipe 10p and a refrigerant not flowing through the bypass pipe 10p. The refrigerant not flowing through the bypass pipe 10p expands at the exterior expansion valve 12 to be reduced in temperature and pressure, and is evaporated in the exterior heat exchanger 13. The gas-phase refrigerant evaporated at the exterior heat exchanger 13 flows into the accumulator 19 and is compressed again by the compressor 11. Whereas, the refrigerant flowing through the bypass pipe 10p is divided into a refrigerant flowing into the interior pipe 20 and a refrigerant flowing into the battery pipe 30, at the branch portion 10b. The refrigerant having flowed into the interior pipe 20 expands at the interior expansion valve 22 to be reduced in temperature and pressure, and is evaporated in the interior heat exchanger 23. Whereas, the refrigerant having flowed into the battery pipe 30 expands at the battery expansion valve 32 to be reduced in temperature and pressure, and is evaporated in the battery heat exchanger 33. The gas-phase refrigerants evaporated in the interior heat exchanger 23 and the battery heat exchanger 33 merge at the merging portion 10j, then flow into the accumulator 19, and are compressed again by the compressor 11.

In the in-parallel dehumidifying-heating battery mode, since the air-conditioning water pump 41 is driven, air-conditioning water circulates through the air-conditioning water pipe 40. In other words, in the in-parallel dehumidifying-heating battery mode, the first radiator 43a and the second radiator 43b indirectly exchange heat between the refrigerant and inside air via the air-conditioning water. The in-parallel dehumidifying-heating battery mode is a mode for simultaneously performing dehumidifying-heating and battery-cooling. The in-parallel dehumidifying-heating battery mode provides an example of the battery mode. The in-parallel dehumidifying-heating battery mode provides an example of the heating mode.

Between the in-series dehumidifying-heating battery mode and the in-parallel dehumidifying-heating battery mode, an amount of the refrigerant flowing to the battery heat exchanger 33 is different. More specifically, in the in-series dehumidifying-heating battery mode, the refrigerant sent by the compressor 11 flows through either the interior heat exchanger 23 or the battery heat exchanger 33. Whereas, in the in-parallel dehumidifying-heating battery mode, a part of the refrigerant sent by the compressor 11 returns to the compressor 11 without flowing through any of the interior heat exchanger 23 and the battery heat exchanger 33. In other words, in the in-series dehumidifying-heating battery mode, the amount of the refrigerant flowing through the battery heat exchanger 33 tends to be larger than that in the in-parallel dehumidifying-heating battery mode.

Hereinafter, oil stagnation in the battery heat exchanger 33 in the non-battery mode will be described. The battery heat exchanger 33 exchanges heat with surrounding air by a refrigerant flowing inside. Here, the refrigerant contains lubricating oil, and circulates in a pipe in a state where the refrigerant and the lubricating oil are mixed. The refrigerant containing the lubricating oil is a heat medium.

In the non-battery mode, although a refrigerant ideally does not flow to the battery heat exchanger 33, a part of the refrigerant may leak into the battery heat exchanger 33. One example of a reason why a part of the refrigerant leaks into the battery heat exchanger 33 in the non-battery mode is due to a pressure difference between an upstream side and a downstream side of the battery pipe 30. In other words, due to a large pressure difference between the branch portion 10b and the merging portion 10j, a part of the refrigerant that should originally flow into the interior pipe 20 leaks into the battery pipe 30. This leaking is likely to occur in two non-battery modes, the exclusive cooling mode and the in-series dehumidifying-heating mode, which are modes in which the pressure difference between the branch portion 10b and the merging portion 10j tends to be large. As in this oil stagnation, oil stagnation caused by the refrigerant entering the battery heat exchanger 33 from a high-pressure side is high-pressure-side oil stagnation.

Another example of the reason why a part of the refrigerant leaks into the battery heat exchanger 33 in the non-battery mode is due to a backflow of the refrigerant flowing through the merging portion 10j. More specifically, when the compressor 11 is driven in the non-battery mode, the refrigerant may flow through a portion forming the merging portion 10j. In this case, when an external force such as vibration is applied to the refrigeration cycle device 1r, the flow of the refrigerant is disturbed. Splashes and the like of the refrigerant generated by the disturbed flow of the refrigerant may flow backward through the battery pipe 30 and enter the battery heat exchanger 33 from the merging portion 10j side. In a case where the refrigeration cycle device 1r is mounted on a vehicle, vibration associated with traveling of the vehicle is applied. Therefore, the backflow of the refrigerant flowing through the merging portion 10j is more likely to be caused. As in this oil stagnation, oil stagnation caused by the refrigerant entering the battery heat exchanger 33 from a low-pressure side is low-pressure-side oil stagnation.

When a part of the refrigerant unintentionally leaks into the battery heat exchanger 33, the refrigerant in the battery heat exchanger 33 is gradually evaporated by being heated by heat exchange with surrounding air. However, the lubricating oil contained in the refrigerant cannot be evaporated but is accumulated in the battery heat exchanger 33. As a result, the lubricating oil is accumulated in the battery heat exchanger 33 in the non-battery mode, and so-called oil stagnation occurs. In a situation where the oil stagnation occurs, an amount of the lubricating oil in the refrigerant becomes insufficient, and smooth operation of the compressor 11 may be hindered. Therefore, it is preferable to quickly eliminate the situation in which the oil stagnation occurs.

Figure 12:
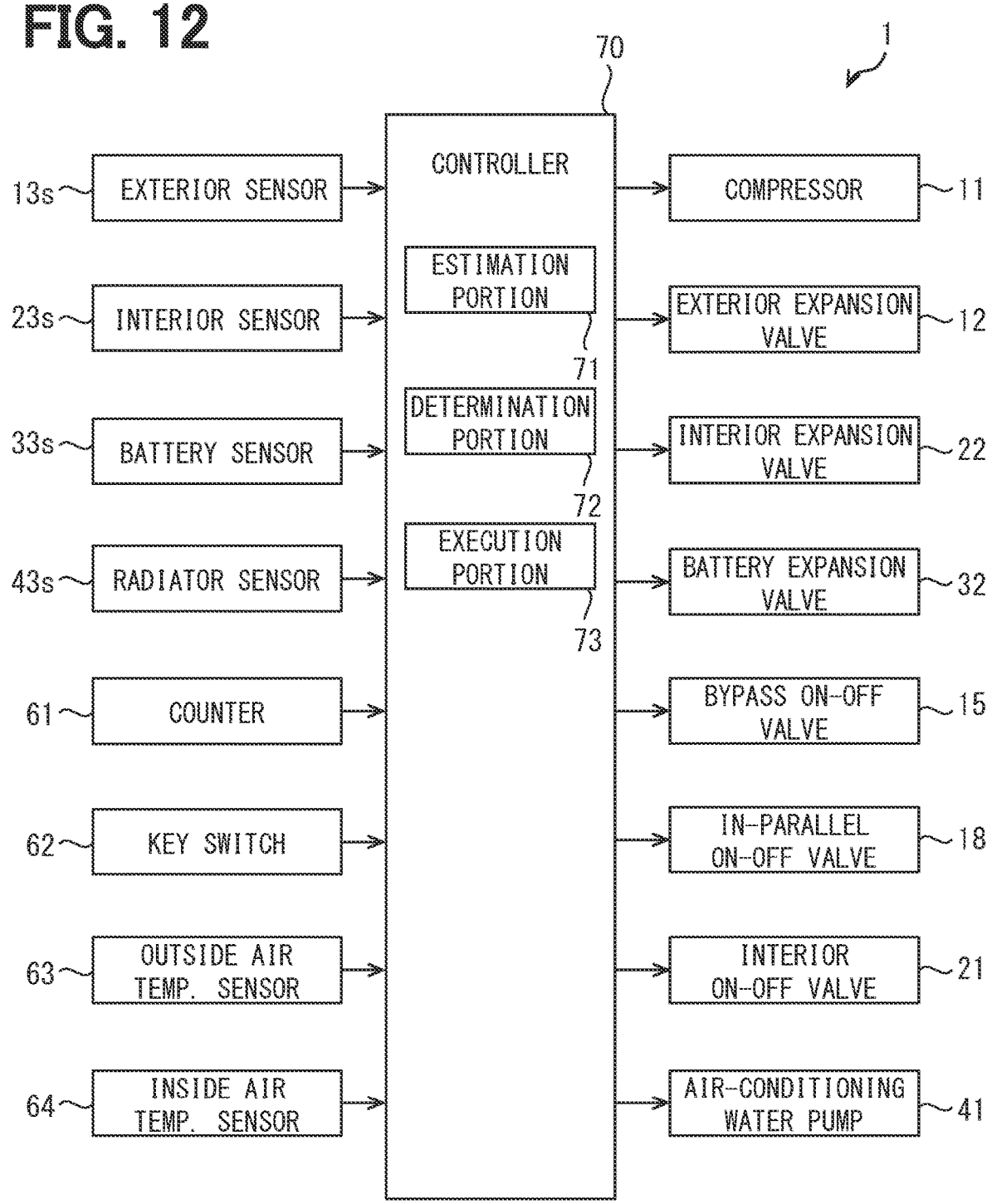
FIG. 12 is a block diagram regarding control of the vehicle air-conditioning device.

In FIG. 12, a controller 70 is connected to an exterior sensor 13s, an interior sensor 23s, and a battery sensor 33s. The exterior sensor 13s includes a temperature sensor that measures a temperature of the exterior heat exchanger 13, and a pressure sensor that measures a pressure of a refrigerant flowing through the exterior heat exchanger 13. The interior sensor 23s includes a temperature sensor that measures a temperature of the interior heat exchanger 23, and a pressure sensor that measures a pressure of a refrigerant flowing through the interior heat exchanger 23. The battery sensor 33s includes a temperature sensor that measures a temperature of the battery heat exchanger 33, and a pressure sensor that measures a pressure of a refrigerant flowing through the battery heat exchanger 33. The controller 70 acquires physical quantities such as a temperature and a pressure measured by the exterior sensor 13s, the interior sensor 23s, and the battery sensor 33s.

The controller 70 is connected to a radiator sensor 43s. The radiator sensor 43s includes a temperature sensor that measures temperatures of the first radiator 43a and the second radiator 43b. The temperature sensor for the first radiator 43a is a temperature sensor that measures a temperature of a refrigerant flowing through the first radiator 43a. The temperature sensor for the second radiator 43b is a temperature sensor that measures a temperature of air-conditioning water flowing through the second radiator 43b. The radiator sensor 43s includes a pressure sensor that measures a pressure of air-conditioning water flowing through the first radiator 43a and the second radiator 43b. The pressure sensor for the first radiator 43a is a pressure sensor that measures a pressure of a refrigerant flowing through the first radiator 43a. The pressure sensor for the second radiator 43b is a pressure sensor that measures a pressure of air-conditioning water flowing through the second radiator 43b. The controller 70 acquires physical quantities such as a temperature and a pressure measured by the radiator sensor 43s.

The controller 70 is connected to a counter 61 and a key switch 62. The counter 61 is a device for measurement of an oil stagnation time or the number of times of oil stagnation. Details of the oil stagnation time and the number of times of oil stagnation will be described later. The controller 70 acquires the oil stagnation time or the number of times of oil stagnation measured by the counter 61. The key switch 62 is a switch for switching of a state of the vehicle among an ignition state, an accessory state, and an off state. The key switch 62 is also called an ignition switch. The controller 70 acquires the state of the vehicle switched by the key switch 62.

The controller 70 is connected to an outside air temp. sensor 63 and an inside air temp. sensor 64. The outside air temp. sensor 63 is a sensor that measures an outside air temperature, which is a temperature of air outside the vehicle compartment. The controller 70 acquires information on the outside air temperature measured by the outside air temp. sensor 63. The inside air temp. sensor 64 is a sensor that measures an inside air temperature, which is the temperature of air inside the vehicle compartment. The controller 70 acquires information on the inside air temperature measured by the inside air temp. sensor 64.

The controller 70 is connected to the compressor 11, the exterior expansion valve 12, the interior expansion valve 22, and the battery expansion valve 32. The controller 70 controls on/off of the compressor 11 and magnitude of output. The controller 70 controls opening degrees of the exterior expansion valve 12, the interior expansion valve 22, and the battery expansion valve 32. However, as the exterior expansion valve 12, the interior expansion valve 22, and the battery expansion valve 32, a mechanical valve device may be employed instead of an electromagnetic valve in which an opening degree can be controlled electrically.

The controller 70 is connected to the bypass on-off valve 15, the in-parallel on-off valve 18, the interior on-off valve 21, and the air-conditioning water pump 41. The bypass on-off valve 15, the in-parallel on-off valve 18, and the interior on-off valve 21 are electromagnetic valves in which an opening degree can be controlled electrically. The controller 70 controls opening degrees of the bypass on-off valve 15, the in-parallel on-off valve 18, and the interior on-off valve 21. The controller 70 can control each on-off valve to any state among a full-open state, a half-open state, and a full-closed state. Further, as the half-open state of each on-off valve, the controller 70 can freely control the opening degree from an opening degree close to the full-open state to an opening degree close to the full-closed state. The controller 70 controls on/off of the air-conditioning water pump 41 and magnitude of output.

The controller 70 includes an estimation unit 71, a determination unit 72, and an execution unit 73. The estimation unit 71 estimates an oil stagnation amount, which is an amount of lubricating oil accumulated in the battery heat exchanger 33. On the basis of the oil stagnation amount, the determination unit 72 determines whether or not the lubricating oil in the battery heat exchanger 33 needs to be recovered. The execution unit 73 executes an oil recovery mode when the determination unit 72 determines that the lubricating oil needs to be recovered. The oil recovery mode is a mode for recovery of lubricating oil accumulated in the battery heat exchanger 33. The execution unit 73 executes the oil recovery mode by executing, for example, an operation mode classified as the battery mode. As a result, by causing a sufficient amount of refrigerant to flow through the battery heat exchanger 33 and the accumulated lubricating oil to flow out together with the refrigerant, the lubricating oil is recovered. However, unlike the normal battery mode, the battery blower 36 may be stopped. By executing the battery mode in a state where the battery blower 36 is stopped, excessive decrease in temperature of the secondary battery 35 can be suppressed.

Figure 13:
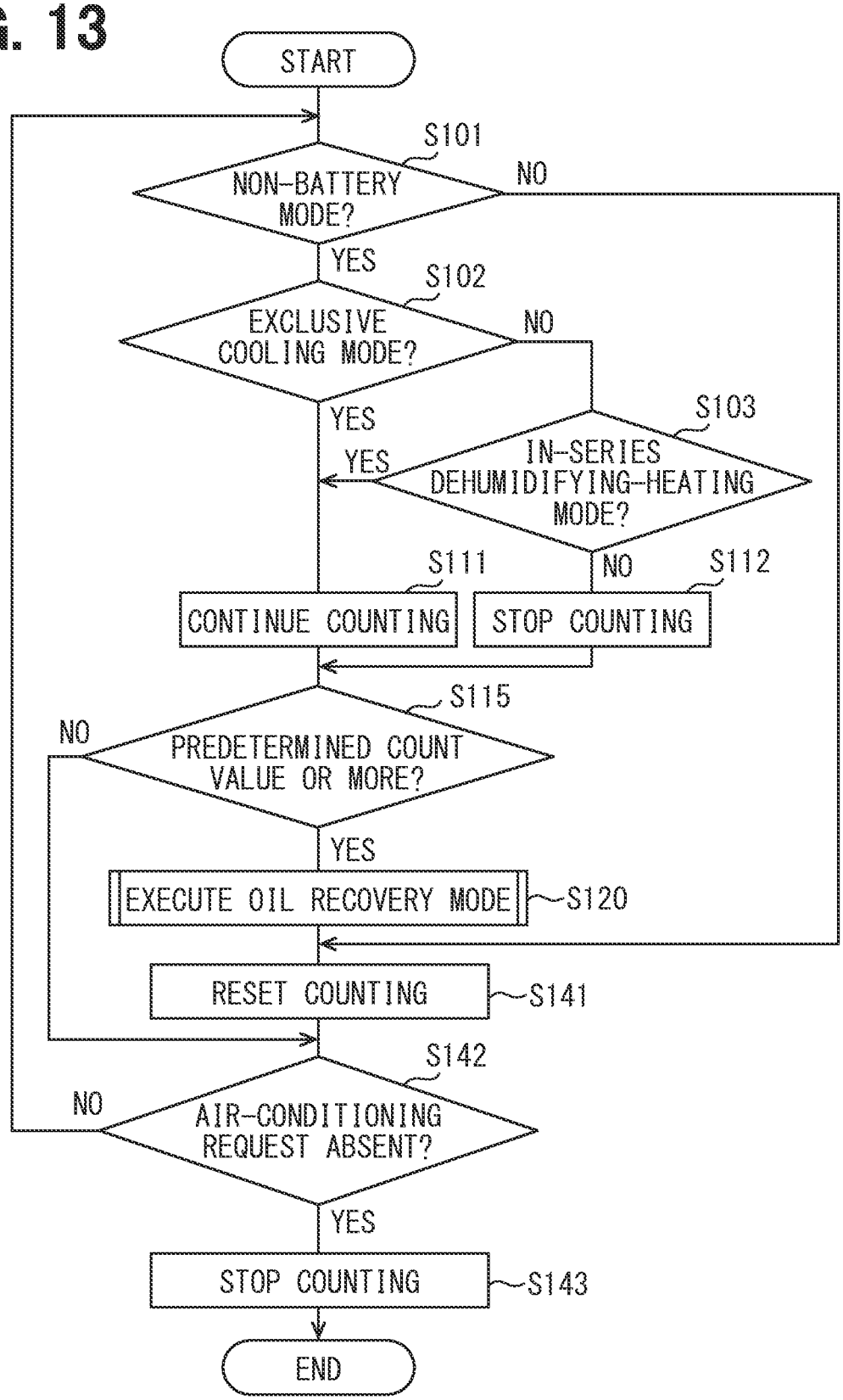
FIG. 13 is a flowchart regarding control of the vehicle air-conditioning device.

Air-conditioning control of the controller 70 in the refrigeration cycle device 1r will be described below. In FIG. 13, when the air-conditioning control is started, it is determined in step S101 whether or not the non-battery mode is being executed. When the non-battery mode is being executed, the process proceeds to step S102. Whereas, when a mode other than the non-battery mode is being executed, that is, when the battery mode is being executed, the process proceeds to step S141.

In step S102, it is determined whether or not the exclusive cooling mode is being executed. When the exclusive cooling mode is being executed, the process proceeds to step S111. Whereas, when the exclusive cooling mode is not being executed, the process proceeds to step S103. The exclusive cooling mode provides an example of an operation mode in which a pressure difference between the branch portion 10b and the merging portion 10j becomes a predetermined pressure difference or more.

In step S103, it is determined whether or not the in-series dehumidifying-heating mode is being executed. When the in-series dehumidifying-heating mode is being executed, the process proceeds to step S111. Whereas, when the in-series dehumidifying-heating mode is not being executed, the process proceeds to step S112. The in-series dehumidifying-heating mode provides an example of an operation mode in which a pressure difference between the branch portion 10b and the merging portion 10j becomes a predetermined pressure difference or more.

In step S111, counting of the counter 61 is advanced. More specifically, the time during which the exclusive cooling mode or the dehumidifying-heating mode is being executed is counted as the oil stagnation time. When the exclusive cooling mode or the in-series dehumidifying-heating mode is being executed, the low-pressure-side oil stagnation and the high-pressure-side oil stagnation may simultaneously occur. Therefore, by increasing the counting of the oil stagnation time, processing is performed in which the oil stagnation amount is considered to be increasing. While a state of advancing the counting of the counter 61 is maintained, the process proceeds to step S115.

In step S112, the counting of the counter 61 is stopped. More specifically, if the counting has already stopped, a state where the counting is stopped is maintained. Whereas, if advancement of the counting continues, the counting is stopped at the current oil stagnation time. When the exclusive heating mode or the in-parallel dehumidifying-heating mode is being executed, only the low-pressure-side oil stagnation may occur. Here, the low-pressure-side oil stagnation has a smaller oil stagnation amount than the high-pressure-side oil stagnation. Therefore, by stopping the counting of the oil stagnation time, processing is performed in which the oil stagnation amount is not considered to be increasing. While the state where the counting of the counter 61 is stopped is maintained, the process proceeds to step S115.

In step S115, it is determined whether or not the counting of the counter 61 is a time equal to or greater than a specified value. When the counting is a time equal to or greater than the specified value, estimation can be made that an execution time of the exclusive cooling mode or the in-series dehumidifying-heating mode is long and the oil stagnation amount in the battery heat exchanger 33 is large. Therefore, when the counting is the time equal to or greater than the specified value, the process proceeds to step S120. Whereas, when the counting is less than the specified value, estimation can be made that the execution time of the exclusive cooling mode or the in-series dehumidifying-heating mode is short and the oil stagnation amount in the battery heat exchanger 33 is small. Therefore, when the counting is the time less than the specified value, the process proceeds to step S142.

Figure 14:
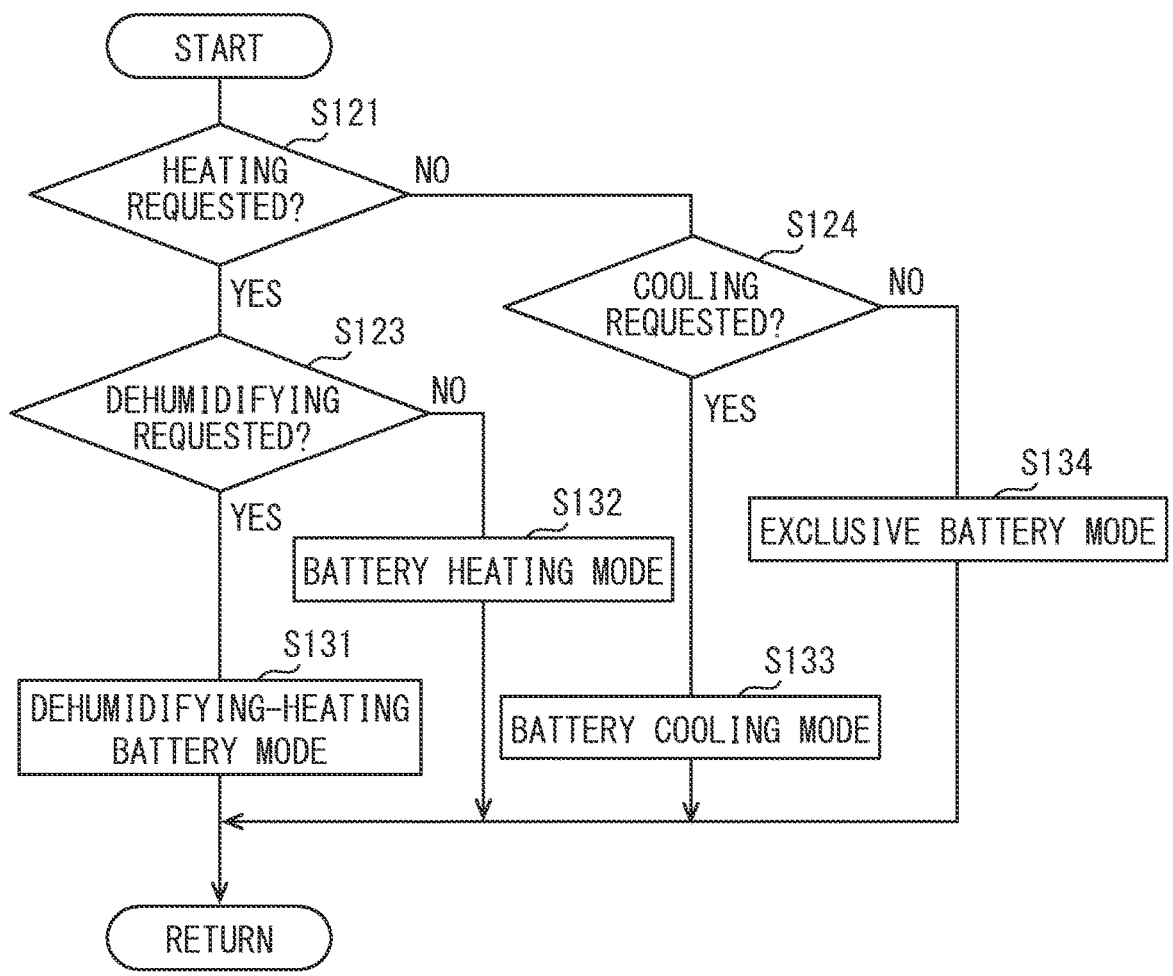
FIG. 14 is a flowchart regarding processing in step S120 in FIG. 13.

In step S120, the oil recovery mode is executed. Details of the oil recovery mode will be described below. In FIG. 14, when the oil recovery mode is started, it is determined in step S121 whether or not there is a heating request. When there is a heating request, the process proceeds to step S123. Whereas, when there is no heating request, the process proceeds to step S124.

In step S123, it is determined whether or not there is a dehumidifying request. When there is a dehumidifying request, the process proceeds to step S131. When there is no dehumidifying request, the process proceeds to step S132.

In step S124, it is determined whether or not there is a cooling request. Here, the cooling request includes the dehumidifying request. When there is a cooling request, the process proceeds to step S133. When there is no cooling request, the process proceeds to step S134.

In step S131, a dehumidifying-heating battery mode is executed. Here, the dehumidifying-heating battery mode is either the in-series dehumidifying-heating battery mode or the in-parallel dehumidifying-heating battery mode. Accordingly, dehumidifying, heating, and battery-cooling are simultaneously performed. By executing the dehumidifying-heating battery mode, a refrigerant can be circulated to the battery heat exchanger 33, and lubricating oil accumulated in the battery heat exchanger 33 can be recovered. After the dehumidifying-heating battery mode is executed for a predetermined time, the oil recovery mode is ended, and the process proceeds to step S141.

In step S132, a battery heating mode is executed. Here, the battery heating mode is either the in-series battery heating mode or the in-parallel battery heating mode. Accordingly, heating and battery-cooling are simultaneously performed. By executing the battery heating mode, a refrigerant can be circulated to the battery heat exchanger 33, and lubricating oil accumulated in the battery heat exchanger 33 can be recovered. After the battery heating mode is executed for a predetermined time, the oil recovery mode is ended, and the process proceeds to step S141.

In step S133, a battery cooling mode is executed. Accordingly, cooling and battery-cooling are simultaneously performed. By executing the battery cooling mode, a refrigerant can be circulated to the battery heat exchanger 33, and lubricating oil accumulated in the battery heat exchanger 33 can be recovered. After the battery cooling mode is executed for a predetermined time, the oil recovery mode is ended, and the process proceeds to step S141.

In step S134, the exclusive battery mode is executed. Thus, only battery-cooling is performed. By executing the exclusive battery mode, a refrigerant can be circulated to the battery heat exchanger 33, and lubricating oil accumulated in the battery heat exchanger 33 can be recovered. After the exclusive battery mode is executed for a predetermined time, the oil recovery mode is ended, and the process proceeds to step S141.

In summary, in the oil recovery mode, any operation mode classified as the battery mode is executed. When the output of the compressor 11 is constant, an amount of a refrigerant flowing to the battery heat exchanger 33 varies depending on the operation mode executed in the oil recovery mode. More specifically, the exclusive battery mode has a largest amount, and the dehumidifying-heating battery mode has a smallest amount. The amount of the refrigerant flowing to the battery heat exchanger 33 is larger in an in-series mode such as the in-series battery heating mode than in an in-parallel mode such as the in-parallel battery heating mode.

In step S141 of FIG. 13, the counting of the counter 61 is reset. More specifically, the time during which the exclusive cooling mode or the in-series dehumidifying-heating mode is being executed is returned to zero. That is, immediately after the oil recovery mode or the battery mode is executed, the oil recovery mode is not executed for a while. In a state where an outside air temperature is high such as summer, an assumption can be made that the battery mode is frequently executed to perform battery-cooling. Therefore, an assumption can be made that the oil recovery mode is more likely to be executed in winter when the outside air temperature is low, and the dehumidifying-heating battery mode and the battery heating mode are often executed as the oil recovery mode. After the counting of the counter 61 is reset, the process proceeds to step S142.

In step S142, the presence or absence of an air-conditioning request is determined. The presence or absence of the air-conditioning request can be determined from a state of the vehicle by an operation of the key switch 62. For example, when the key switch 62 is in the off state, there is at least no air-conditioning request. The presence or absence of the air-conditioning request may be determined by determining the presence or absence of an air-conditioning request for cooling, heating, and dehumidifying from an operation result of an air-conditioning switch operated by an occupant, for example. The key switch 62 provides an example of a switch device. The air-conditioning switch provides an example of the switch device.

When there is a request for performing air-conditioning of any of cooling, heating, and battery-cooling, that is, when an air-conditioning request is present, the process returns to step S101. As a result, a series of control is repeated again on the basis of the latest state where the air-conditioning operation has progressed. Whereas, when the air-conditioning request is absent, the process proceeds to step S143. The case where an air-conditioning request is present is a state where the compressor 11 is driven. Whereas, the case where the air-conditioning request is absent is a cycle idle state where the compressor 11 is not driven.

In step S143, the counting of the counter 61 is stopped. This causes a state where the current oil stagnation time is stored in the counter 61. After the counting of the counter 61 is stopped, the air-conditioning control is ended. In this case, the counter 61 has stored the oil stagnation time. Therefore, when the air-conditioning control is started next, the counting is controlled with the oil stagnation time already stored, as an initial value. In other words, when a start and an end of the air-conditioning control are repeated, the counter 61 counts an accumulated value of the oil stagnation time until the counting is reset.

According to the above-described embodiment, the controller 70 estimates the oil stagnation amount in the battery heat exchanger 33 accompanying execution of the non-battery mode. Furthermore, the controller 70 executes the oil recovery mode when determining that lubricating oil needs to be recovered. Therefore, oil stagnation in the battery heat exchanger 33 caused by execution of the non-battery mode can be detected and eliminated. Accordingly, it is possible to provide the refrigeration cycle device 1r that suppresses oil stagnation in the battery heat exchanger 33.

The controller 70 executes a countermeasure against oil stagnation by executing the oil recovery mode. Therefore, as the countermeasure against oil stagnation, the number of components of the entire refrigeration cycle device 1r can be reduced as compared with a case where a valve device or the like is provided on the branch portion 10b side or the merging portion 10j side of the battery pipe 30. Accordingly, the manufacturing cost of the refrigeration cycle device 1r can be easily reduced.

The estimation unit 71 estimates that the oil stagnation amount is larger as the oil stagnation time is longer. Therefore, it is possible to estimate the oil stagnation amount without using a sensor or the like for measurement of the oil stagnation amount in the battery heat exchanger 33. Accordingly, oil stagnation in the battery heat exchanger 33 can be suppressed with a simple configuration.

The counter 61 counts a time during which the exclusive cooling mode or the in-series dehumidifying-heating mode is being executed, as the oil stagnation time. In other words, the counter 61 measures, as the oil stagnation time, a time during which the compressor 11 is driven in a mode in which the pressure difference between the branch portion 10b and the merging portion 10j becomes a predetermined pressure difference or more, in the non-battery mode. Therefore, a drive time of the compressor 11 in a situation where the high-pressure-side oil stagnation and the low-pressure-side oil stagnation may simultaneously occur can be counted as the oil stagnation time. Accordingly, as compared with a case where the drive time of the compressor 11 in the non-battery mode is always counted as the oil stagnation time, the number of operation modes to be counted by the counter 61 can be reduced.

The execution unit 73 executes the oil recovery mode in a mode including heating when there is a heating request, and executes the oil recovery mode in a mode not including heating when there is no heating request. In addition, the execution unit 73 executes the oil recovery mode in a mode including dehumidifying when there is a dehumidifying request, and executes the oil recovery mode in a mode not including dehumidifying when there is no dehumidifying request. In addition, a cooling request is similar to the dehumidifying request. Therefore, lubricating oil in the battery heat exchanger 33 can be recovered while air-conditioning control desired by the occupant is maintained. Accordingly, it is easy to suppress impairment of comfort in the vehicle compartment due to execution of the oil recovery mode.

Second Embodiment

This embodiment is a modification having the preceding embodiment as a basic embodiment. In this embodiment, the counting of the counter 61 is always advanced during execution of the non-battery mode. In the oil recovery mode, an operation mode not including heating is executed before completion of warming-up, even when there is a heating request.

Figure 15:
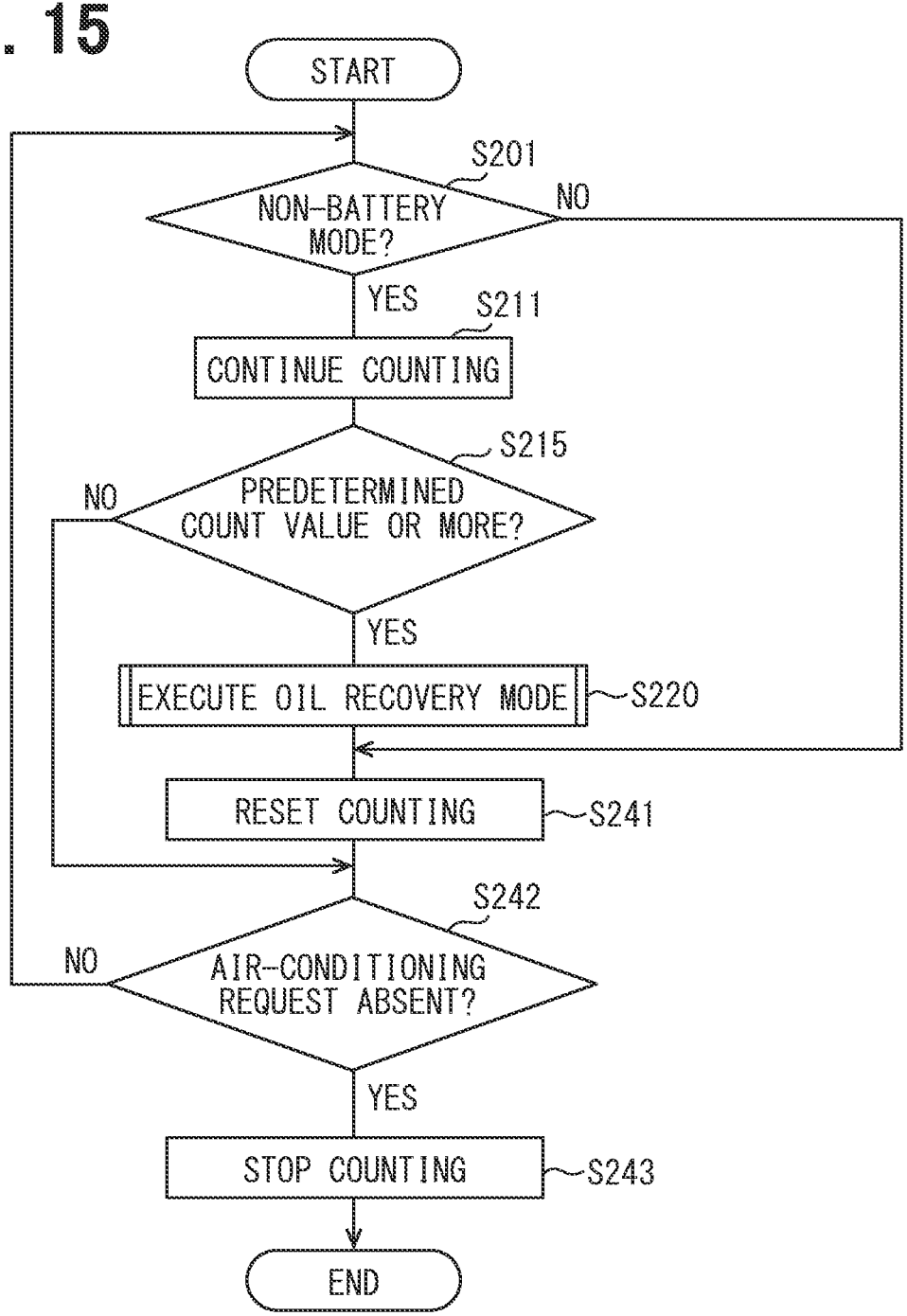
FIG. 15 is a flowchart regarding control of a vehicle air-conditioning device in a second embodiment.

Air-conditioning control of the controller 70 in the refrigeration cycle device 1r will be described below. In FIG. 15, when the air-conditioning control is started, it is determined in step S201 whether or not the non-battery mode is being executed. When the non-battery mode is being executed, the process proceeds to step S211. Whereas, when the battery mode is being executed, the process proceeds to step S241.

In step S211, the counting of the counter 61 is advanced. More specifically, the time during which the non-battery mode is being executed is counted as the oil stagnation time. When the non-battery mode is being executed, at least low-pressure-side oil stagnation may occur. Therefore, by increasing the counting of the oil stagnation time, processing is performed in which the oil stagnation amount is considered to be increasing. While a state of advancing the counting of the counter 61 is maintained, the process proceeds to step S215.

In step S215, it is determined whether or not the counting of the counter 61 is a time equal to or greater than a specified value. When the counting is a time equal to or greater than the specified value, estimation can be made that an execution time of the non-battery mode is long and the oil stagnation amount in the battery heat exchanger 33 is large. Therefore, when the counting is the time equal to or greater than the specified value, the process proceeds to step S220. Whereas, when the counting is less than the specified value, estimation can be made that the execution time of the non-battery mode is short and the oil stagnation amount in the battery heat exchanger 33 is small. Therefore, when the counting is a time less than the specified value, the process proceeds to step S242.

Figure 16:
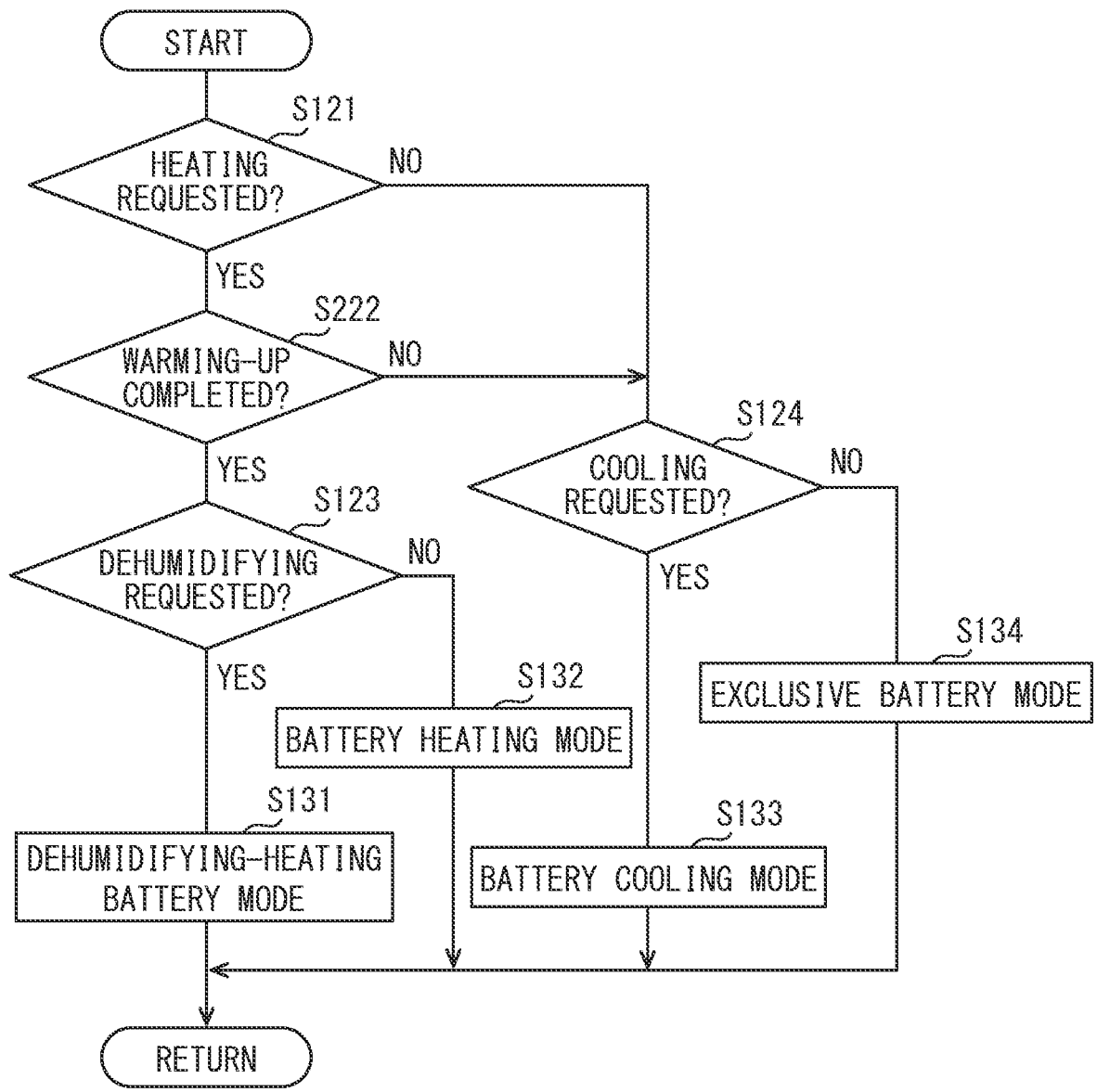
FIG. 16 is a flowchart regarding processing in step S220 in FIG. 15.

In step S220, the oil recovery mode is executed. Details of the oil recovery mode will be described below. In FIG. 16, when the oil recovery mode is started, it is determined in step S121 whether or not there is a heating request. When there is a heating request, the process proceeds to step S222. Whereas, when there is no heating request, the process proceeds to step S124.

In step S222, it is determined whether or not warming-up of the second radiator 43b has been completed. Whether or not the warming-up of the second radiator 43b has been completed can be determined by whether or not a temperature of the second radiator 43b is a warming-up completion temperature or higher. Here, the warming-up completion temperature is a temperature at which the warming-up can be considered to be completed. The warming-up completion temperature can be set to a temperature higher than an outside air temperature by a predetermined temperature or higher. For example, when the outside air temperature is 10° C. and the predetermined temperature is 5° C., the warming-up completion temperature is 15° C. A method for setting the warming-up completion temperature is not limited to the above-described method. For example, the warming-up completion temperature may be always set to a predetermined temperature such as 20° C. For example, the warming-up completion temperature may be set on the basis of a target blowing temperature calculated during the heating operation.

The temperature of the second radiator 43b can be measured using the radiator sensor 43s. However, the temperature of the second radiator 43b may be estimated from a sensor other than the radiator sensor 43s. For example, the air-conditioning water pipe 40 may include a water temperature sensor that measures a temperature of the air-conditioning water, and a water temperature measured by the water temperature sensor may be regarded as the temperature of the second radiator 43b.

When the warming-up of the second radiator 43b has been completed, it is determined that an operation mode including heating should be executed, and the process proceeds to step S123. Whereas, when the warming-up of the second radiator 43b has not been completed, it is determined that the oil recovery should be prioritized over heating, and the process proceeds to step S124.

In step S123, the presence or absence of a dehumidifying request is determined. When there is a dehumidifying request, the process proceeds to step S131 to execute the dehumidifying-heating battery mode and end the oil recovery mode. When there is no dehumidifying request, the process proceeds to step S132 to execute the battery heating mode and execute the oil recovery mode.

In step S124, the presence or absence of a cooling request is determined. When there is a cooling request, the process proceeds to step S133 to execute the battery cooling mode and end the oil recovery mode. When there is no cooling request, the process proceeds to step S134 to execute the exclusive battery mode and execute the oil recovery mode.

In summary, in the oil recovery mode, when the warming-up has not been completed, the dehumidifying-heating battery mode and the battery heating mode are not executed even when there is a heating request. Therefore, opportunities to execute the dehumidifying-heating battery mode or the battery heating mode are reduced, and timings to execute the battery cooling mode or the exclusive battery mode are increased.

In step S241 of FIG. 15, the counting of the counter 61 is reset. More specifically, the time during which the non-battery mode is being executed is returned to zero. After the counting of the counter 61 is reset, the process proceeds to step S242.

In step S242, the presence or absence of an air-conditioning request is determined. When there is a request for performing air-conditioning of any of cooling, heating, and battery-cooling, that is, when an air-conditioning request is present, the process returns to step S201. As a result, a series of control is repeated again on the basis of the latest state where the air-conditioning operation has progressed. Whereas, when the air-conditioning request is absent, the process proceeds to step S243.

In step S243, the counting of the counter 61 is stopped. In a state where the current oil stagnation time is stored in the counter 61, the air-conditioning control is ended.

According to the above-described embodiment, when the temperature of the second radiator 43b is the warming-up completion temperature or higher and there is a heating request, the execution unit 73 executes the oil recovery mode in a mode including heating. Furthermore, when the temperature of the second radiator 43b is lower than the warming-up completion temperature, the oil recovery mode is executed in a mode not including heating even when there is a heating request. Therefore, opportunities to execute the dehumidifying-heating battery mode or the battery heating mode can be reduced, and opportunities to execute the battery cooling mode or the exclusive battery mode can be increased. Accordingly, the oil recovery mode can be executed with simple control without control related to heating.

The execution unit 73 executes the oil recovery mode in a mode not including heating until warming-up of the second radiator 43b is completed. In other words, after the oil recovery mode is executed and the counting of the counter 61 is reset, the mode including heating is started. Therefore, it is possible to secure a long time from a start of heating until the counting becomes a specified value or more next. Therefore, it is possible to reduce a frequency of switching to the oil recovery mode, during the warming-up until the warming-up is completed. As described above, it is easy to suppress a large change in heating ability during the warming-up and a large change in temperature of air-conditioning wind blown into the compartment.

The controller 70 sets the warming-up completion temperature to a temperature higher than the outside air temperature. Therefore, it is possible to detect a rise in temperature of the second radiator 43b from a temperature corresponding to the outside air temperature. Accordingly, it is easy to accurately determine whether or not the warming-up of the second radiator 43b has been completed, as compared with a case where the warming-up completion temperature is set to a temperature lower than the outside air temperature.

Third Embodiment

This embodiment is a modification having the preceding embodiment as a basic embodiment. In this embodiment, the battery pipe 30 is provided with a battery on-off valve 331 and a battery check valve 339. In addition, the number of times of on/off switching of the key switch 62 in the non-battery mode is counted to estimate an oil stagnation amount.

Figure 17:
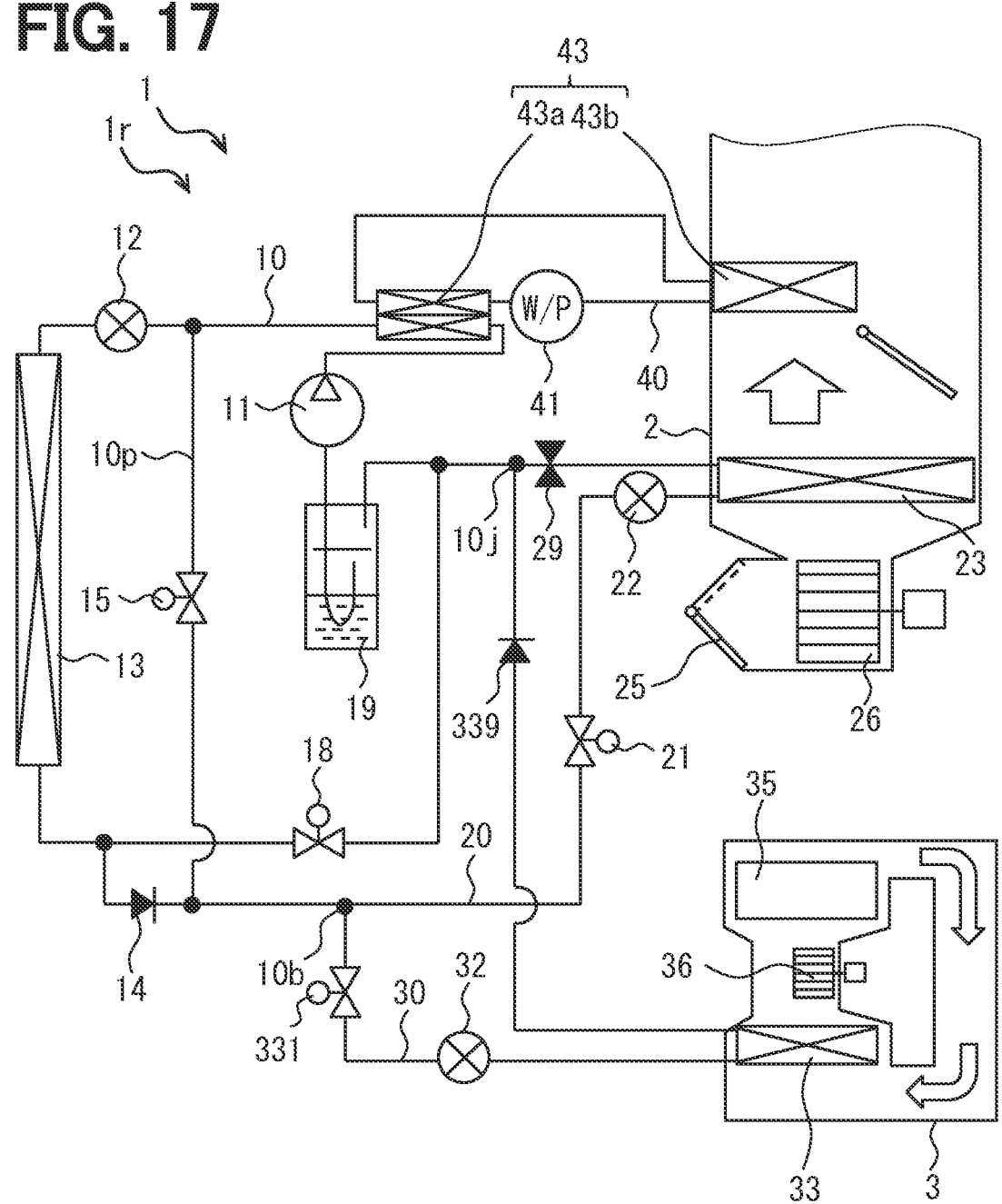
FIG. 17 is a configuration diagram illustrating a configuration of a vehicle air-conditioning device in a third embodiment.

In FIG. 17, the battery pipe 30 is provided with the battery on-off valve 331 and the battery check valve 339. In a portion of the battery pipe 30 from the branch portion 10b to the battery heat exchanger 33, the battery on-off valve 331 is provided in a portion between the branch portion 10b and the battery expansion valve 32. The battery on-off valve 331 is a valve device that controls an amount of refrigerant flowing through the battery pipe 30. The battery on-off valve 331 is an electromagnetic valve in which an opening degree can be controlled electrically. The battery on-off valve 331 is a valve device that is always in a full-open state at a time of non-energization in which there is no control by the controller 70. In a state where the key switch 62 is in the ignition state and the operation mode is the non-battery mode, the battery on-off valve 331 is in the full-closed state. Whereas, in a state where the key switch 62 is in the off state or the operation mode is the battery mode, the battery on-off valve 331 is in the full-open state or the half-open state. The battery on-off valve 331 provides an example of a switching valve.

The battery check valve 339 is provided in a portion of the battery pipe 30 from the battery heat exchanger 33 to the merging portion 10j. The battery check valve 339 is a backflow prevention device that prevents a backflow of a refrigerant. The battery check valve 339 allows a flow from the battery heat exchanger 33 toward the merging portion 10j, and regulates a flow from the merging portion 10j toward the battery heat exchanger 33. As the backflow prevention device, a shape may be adopted in which a part of a portion of the battery pipe 30 from the battery heat exchanger 33 to the merging portion 10j rises against gravity. As the backflow prevention device, an on-off valve in which an opening degree can be controlled electrically may be adopted.

The battery on-off valve 331 and the battery check valve 339 can prevent unintentional leaking of the refrigerant into the battery heat exchanger 33 during the non-battery mode. In other words, by bringing the battery on-off valve 331 into the full-closed state, it is possible to prevent the refrigerant from entering the battery heat exchanger 33 from the branch portion 10b side. In addition, the battery check valve 339 can prevent the refrigerant from flowing backward and entering the battery heat exchanger 33 from the merging portion 10j side.

Even when the battery on-off valve 331 and the battery check valve 339 are provided, oil stagnation of the battery heat exchanger 33 may be caused. One example of a reason why the oil stagnation is caused in the battery heat exchanger 33 is due to a refrigerant flowing between the battery on-off valve 331 and the battery expansion valve 32. While the non-battery mode is being executed, the battery on-off valve 331 is in the full-closed state. In this state, when the key switch 62 is switched to the off state, the air-conditioning operation is turned off and energization to the battery on-off valve 331 is stopped. Therefore, the battery on-off valve 331 is switched from the full-closed state to the full-open state. When the battery on-off valve 331 is brought into the full-open state, a refrigerant located on an upstream side of the battery on-off valve 331 passes through the battery on-off valve 331 due to gravity or a pressure difference. The battery expansion valve 32 is closed when the key switch 62 is in the off state. Therefore, the refrigerant having passed through the battery on-off valve 331 is accumulated between the battery on-off valve 331 and the battery expansion valve 32.

Thereafter, when the key switch 62 is switched to the ignition state again and the non-battery mode is executed, the battery on-off valve 331 is controlled to the full-closed state. When a pressure in the merging portion 10j decreases due to execution of the non-battery mode, the refrigerant is pulled toward the merging portion 10j having a low pressure, and passes through the battery expansion valve 32. That is, the refrigerant accumulated between the battery on-off valve 331 and the battery expansion valve 32 when the key switch 62 is in the off state leaks into the battery heat exchanger 33. As described above, every time the ignition state and the off state are switched by the operation of the key switch 62, the refrigerant leaks little by little into the battery heat exchanger 33. The lubricating oil contained in the refrigerant leaking into the battery heat exchanger 33 cannot be evaporated but is accumulated in the battery heat exchanger 33, which causes oil stagnation.

The oil stagnation due to the refrigerant flowing between the battery on-off valve 331 and the battery expansion valve 32 is high-pressure-side oil stagnation. As an inner diameter and a length of the battery pipe 30 from the battery on-off valve 331 to the battery expansion valve 32 are larger, the high-pressure-side oil stagnation is more likely to be caused. Further, this high-pressure-side oil stagnation is more likely to be caused as the pressure at the merging portion 10j is lower.

Figure 18:
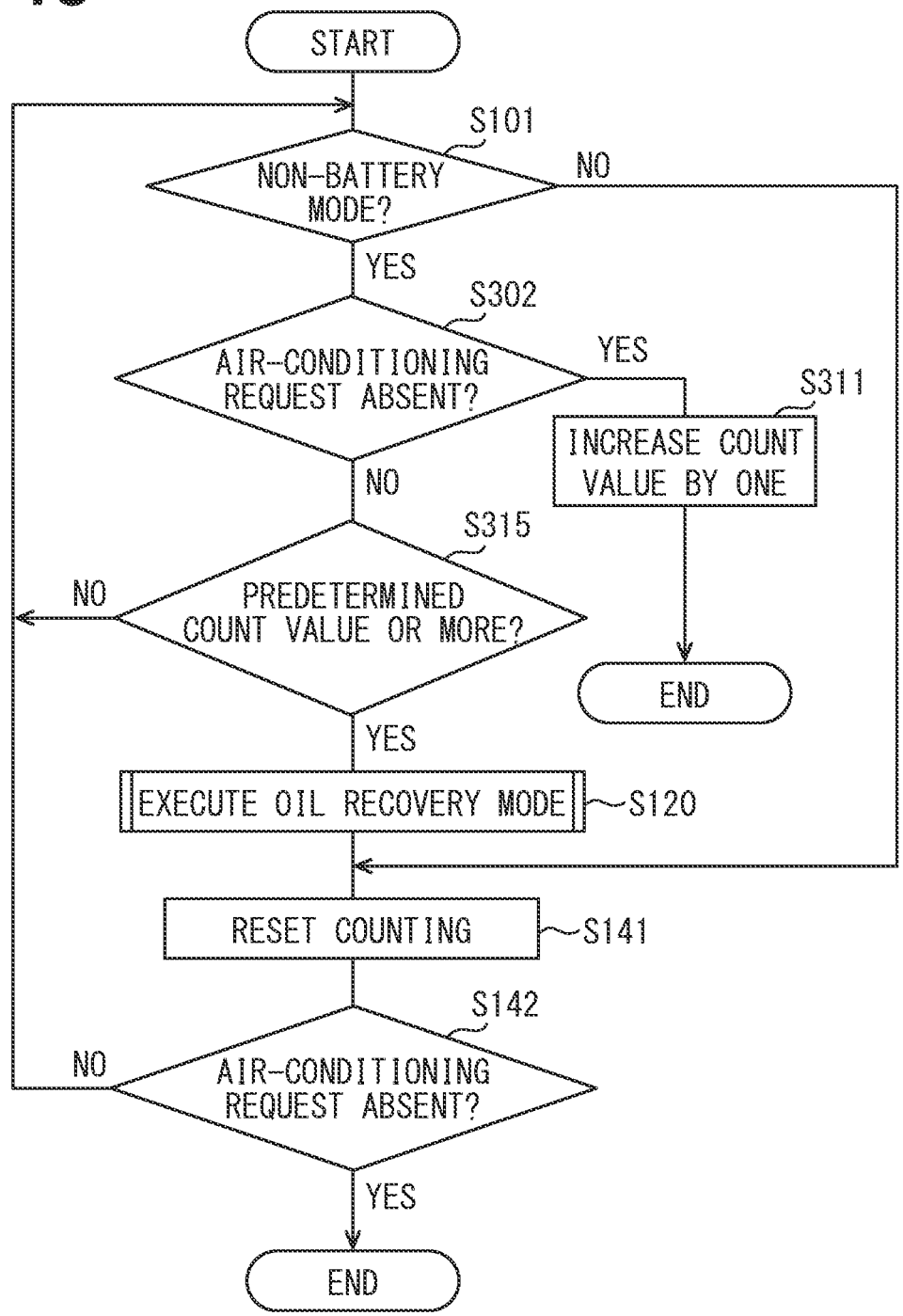
FIG. 18 is a flowchart regarding control of the vehicle air-conditioning device in the third embodiment.

Air-conditioning control of the controller 70 in the refrigeration cycle device 1r will be described below. In FIG. 18, when the air-conditioning control is started, it is determined in step S101 whether or not the non-battery mode is being executed. When the non-battery mode is being executed, the process proceeds to step S302. Whereas, when the battery mode is being executed, the process proceeds to step S141.

In step S302, the presence or absence of an air-conditioning request is determined. When an air-conditioning request is absent, it is determined that the non-battery mode needs to be ended, and the process proceeds to step S311. Whereas, when the air-conditioning request is present, the process proceeds to step S315.

In step S311, the counting of the counter 61 is advanced by one. More specifically, the number of times of oil stagnation, which is the number of times that the key switch 62 is switched to the off state during execution of the non-battery mode, is counted. While the number of times counted by the counter 61 is maintained, the air-conditioning control is ended. In this case, the counting of the counter 61 has been incremented by one. Therefore, when the air-conditioning control is started next, the counting is controlled with the number of times of oil stagnation already stored, as an initial value. In other words, when a start and an end of the air-conditioning control are repeated, the counter 61 counts an accumulated value of the number of times of oil stagnation until the counting is reset.

In step S315, it is determined whether or not the counting of the counter 61 is the number of times equal to or greater than a specified value. When the counting is the number of times equal to or greater than the specified value, estimation can be made that the number of times the air-conditioning is turned off during execution of the non-battery mode is large, and the oil stagnation amount in the battery heat exchanger 33 is large. Therefore, the process proceeds to step S120. Whereas, when the counting is less than the specified value, estimation can be made that the number of times the air-conditioning is turned off during execution of the non-battery mode is small, and the oil stagnation amount in the battery heat exchanger 33 is small. Therefore, the process returns to step S101, and the execution of the non-battery mode is maintained until the battery mode is executed or the air-conditioning request disappears.

In step S120, the oil recovery mode is executed. After execution of the oil recovery mode, the process proceeds to step S141, and the counting of the counter 61 is reset. More specifically, the number of times the air-conditioning is turned off during the execution of the non-battery mode is returned to zero. After the counting of the counter 61 is reset, the process proceeds to step S142.

In step S142, the presence or absence of an air-conditioning request is determined. When an air-conditioning request is present, the process proceeds to step S101, and a series of air-conditioning control is repeated. Whereas, when the air-conditioning request is absent, the air-conditioning control is ended. In this case, the counting of the counter 61 is not advanced, and the number of times of reset is stored.

According to the embodiment described above, the counter 61 measures the number of times of oil stagnation, which is the number of times the key switch 62 is switched off during the execution of the non-battery mode. Furthermore, the estimation unit 71 estimates that an oil stagnation amount is larger as the number of times of oil stagnation is larger. Therefore, it is possible to execute the oil recovery mode by detecting oil stagnation caused by on/off switching of the key switch 62. Accordingly, it is possible to detect oil stagnation caused by a reason other than oil stagnation due to a pressure difference between the upstream side and the downstream side of the battery pipe 30 and oil stagnation due to a backflow of a refrigerant flowing through the merging portion 10*j*, and the oil stagnation can be eliminated.

Other Embodiments

The estimation unit 71 may estimate an oil stagnation amount on the basis of information on both the oil stagnation time and the number of times of oil stagnation. For example, a sum of an oil stagnation amount estimated from the oil stagnation time and an oil stagnation amount estimated from the number of times of oil stagnation is estimated as a total oil stagnation amount. According to this embodiment, it is easy to estimate an accurate oil stagnation amount as compared with a case of estimating the oil stagnation amount on the basis of only one of the oil stagnation time and the number of times of oil stagnation.

The disclosure in this specification is not limited to the illustrated embodiment. The disclosure encompasses the illustrated embodiments and modifications by those skilled in the art based thereon. For example, the disclosure is not limited to the parts and/or combinations of elements shown in the embodiments. The disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

Disclosure in the description, drawings, etc. is not limited by the description of the scope of claims. The disclosure in the description, drawings, etc. includes the technical ideas described in the claims, and further covers a wider variety of technical ideas than the technical ideas described in the claims. Therefore, various technical ideas can be extracted from the disclosure of the description, drawings, etc. without being bound by the description of the claims.

The control unit and its method described in the present disclosure may be realized by a dedicated computer constituting a processor programmed to perform one or more functions embodied by a computer program. Alternatively, the apparatus and method thereof described in the present disclosure may be realized by a dedicated hardware logic circuit. Alternatively, the apparatus and method thereof described in the present disclosure may be realized by one or more dedicated computers configured by a combination of a processor that executes a computer program and one or more hardware logic circuits. Further, the computer program may be stored in a computer-readable non-transitional tangible recording medium as an instruction executed by the computer.

What is claimed is:

1. A refrigeration cycle device comprising:
    a compressor configured to compress a refrigerant containing lubricating oil;
    a radiator configured to radiate heat from the refrigerant compressed by the compressor;
    an exterior heat exchanger configured to exchange heat between outside air and the refrigerant;
    an interior heat exchanger configured to exchange heat between inside air and the refrigerant;
    a battery heat exchanger configured to exchange heat between a battery device and the refrigerant;
    a refrigerant pipe connecting the compressor, the radiator, the exterior heat exchanger, the interior heat exchanger, and the battery heat exchanger to form a refrigerant flow path;
    a switching valve configured to switch between a battery mode in which the refrigerant flows to the battery heat exchanger and a non-battery mode in which the refrigerant bypasses the battery heat exchanger;
    a controller configured to control the compressor and the switching valve, wherein
    the controller includes
        an estimation unit configured to estimate an oil stagnation amount, the oil stagnation amount being an amount of lubricating oil accumulated in the battery heat exchanger in accordance with execution of the non-battery mode,
        a determination unit configured to determine whether lubricating oil in the battery heat exchanger needs to be recovered based on the oil stagnation amount, and
        an execution unit configured to execute an oil recovery mode for recovery of the lubricating oil in the battery heat exchanger when the determination unit determines that lubricating oil needs to be recovered, and
    a counter configured to measure an oil stagnation time, the oil stagnation time being a drive time for which the compressor is driven in the non-battery mode, wherein the estimation unit estimates that the oil stagnation amount becomes larger as the oil stagnation time becomes longer.

2. The refrigeration cycle device according to claim 1, wherein
the refrigerant pipe includes
an interior pipe configured to allow the refrigerant to flow to the interior heat exchanger,
a battery pipe configured to allow the refrigerant to flow to the battery heat exchanger,
a branch portion branching into two refrigerant flow paths of the interior pipe and the battery pipe, and
a merging portion joining the two refrigerant flow paths of the interior pipe and the battery pipe, and
the counter measures a time, as the oil stagnation time, for which the compressor is driven in a state in which a pressure difference between the branching portion and the merging portion becomes a predetermined pressure difference or more in the non-battery mode.

3. A refrigeration cycle device comprising:
a compressor configured to compress a refrigerant containing lubricating oil;
a radiator configured to radiate heat from the refrigerant compressed by the compressor;
an exterior heat exchanger configured to exchange heat between outside air and the refrigerant;
an interior heat exchanger configured to exchange heat between inside air and the refrigerant;
a battery heat exchanger configured to exchange heat between a battery device and the refrigerant;
a refrigerant pipe connecting the compressor, the radiator, the exterior heat exchanger, the interior heat exchanger, and the battery heat exchanger to form a refrigerant flow path;
a switching valve configured to switch between a battery mode in which the refrigerant flows to the battery heat exchanger and a non-battery mode in which the refrigerant bypasses the battery heat exchanger;
a controller including at least one processor and a memory, and configured to control the compressor and the switching valve, wherein the controller is configured
to estimate an oil stagnation amount, the oil stagnation amount being an amount of lubricating oil accumulated in the battery heat exchanger in accordance with execution of the non-battery mode,
to determine whether lubricating oil in the battery heat exchanger needs to be recovered based on the oil stagnation amount, and
to execute an oil recovery mode for recovery of the lubricating oil in the battery heat exchanger when the determination unit determines that lubricating oil needs to be recovered;
a switch device configured to switch between a state where the compressor is driven and a state where the compressor is stopped; and
a counter configured to measure a number of times of oil stagnation, corresponding to a number of times at which the switch device is switched off during execution of the non-battery mode, wherein
the controller estimates that the oil stagnation amount becomes larger as the number of times of oil stagnation becomes larger.

4. The refrigeration cycle device according to claim 3, wherein
the radiator includes
a first radiator configured to exchange heat between the refrigerant compressed by the compressor and air-conditioning water,
a second radiator configured to exchange heat between inside air and air-conditioning water,
an air-conditioning water pump configured to cause air-conditioning water to circulate, and
an air-conditioning water pipe connecting the first radiator, the second radiator, and the air-conditioning water pump to form an air-conditioning water flow path, and
the controller executes the oil recovery mode in a state with a heating of a vehicle compartment when a heating request is present, and executes the oil recovery mode in a state without heating the vehicle compartment when the heating request is absent.

5. A refrigeration cycle device comprising:
a compressor configured to compress a refrigerant containing lubricating oil;
a radiator configured to radiate heat from the refrigerant compressed by the compressor;
an exterior heat exchanger configured to exchange heat between outside air and the refrigerant;
an interior heat exchanger configured to exchange heat between inside air and the refrigerant;
a battery heat exchanger configured to exchange heat between a battery device and the refrigerant;
a refrigerant pipe connecting the compressor, the radiator, the exterior heat exchanger, the interior heat exchanger, and the battery heat exchanger to form a refrigerant flow path;
a switching valve configured to switch between a battery mode in which the refrigerant flows to the battery heat exchanger and a non-battery mode in which the refrigerant bypasses the battery heat exchanger;
a controller including at least one processor and a memory, and configured to control the compressor and the switching valve, wherein the controller is configured
to estimate an oil stagnation amount, the oil stagnation amount being an amount of lubricating oil accumulated in the battery heat exchanger in accordance with execution of the non-battery mode,
to determine whether lubricating oil in the battery heat exchanger needs to be recovered based on the oil stagnation amount, and
to execute an oil recovery mode for recovery of the lubricating oil in the battery heat exchanger when the determination unit determines that lubricating oil needs to be recovered, wherein
the radiator includes
a first radiator configured to exchange heat between the refrigerant compressed by the compressor and air-conditioning water,
a second radiator configured to exchange heat between inside air and air-conditioning water,
an air-conditioning water pump configured to cause air-conditioning water to circulate, and
an air-conditioning water pipe connecting the first radiator, the second radiator, and the air-conditioning water pump to form an air-conditioning water flow path, and
the controller executes the oil recovery mode in a state with a heating of a vehicle compartment when a heating request is present, and executes the oil recovery mode in a state without heating the vehicle compartment when the heating request is absent, the refrigeration cycle device further comprising a radiator sensor configured to measure a temperature of the second radiator, wherein the controller is configured
- to execute the oil recovery mode in the state with the heating of the vehicle compartment when the temperature of the second radiator is a warming-up completion temperature or higher and there is the heating request, and
- to execute the oil recovery mode in the state without heating the vehicle compartment even if there is the heating request when the temperature of the second radiator is lower than the warming-up completion temperature.

6. The refrigeration cycle device according to claim 5, further comprising an outside air temperature sensor configured to measure an outside air temperature that is a temperature of outside air of the vehicle compartment, wherein the controller sets the warming-up completion temperature to a temperature higher than the outside air temperature.

7. A refrigeration cycle device comprising:

a compressor configured to compress a refrigerant containing lubricating oil;

a radiator configured to radiate heat from the refrigerant compressed by the compressor;

an exterior heat exchanger configured to exchange heat between outside air and the refrigerant;

an interior heat exchanger configured to exchange heat between inside air and the refrigerant;

a battery heat exchanger configured to exchange heat between a battery device and the refrigerant;

a refrigerant pipe connecting the compressor, the radiator, the exterior heat exchanger, the interior heat exchanger, and the battery heat exchanger to form a refrigerant cycle in which the refrigerant circulates;

a switching valve configured to switch between a battery mode in which the refrigerant flows to the battery heat exchanger and a non-battery mode in which the refrigerant bypasses the battery heat exchanger;

a controller including at least one processor and a memory, and configured to control the compressor and the switching valve, and a counter configured to measure an oil stagnation time, the oil stagnation time being a drive time for which the compressor is driven in the non-battery mode, wherein the controller is configured
- to estimate an oil stagnation amount, the oil stagnation amount being an amount of lubricating oil accumulated in the battery heat exchanger in accordance with execution of the non-battery mode,
- to determine whether lubricating oil in the battery heat exchanger needs to be recovered based on the oil stagnation amount, and
- to execute an oil recovery mode for recovery of the lubricating oil in the battery heat exchanger when the determination unit determines that lubricating oil needs to be recovered, wherein the controller estimates that the oil stagnation amount becomes larger as the oil stagnation time becomes longer.

* * * * *